United States Patent
Moser et al.

(10) Patent No.: US 10,044,842 B2
(45) Date of Patent: *Aug. 7, 2018

(54) SYSTEM OF ENABLING OR DISABLING A COMMUNICATION DEVICE AND RELATED METHODS

(71) Applicant: Quiet, Inc., La Jolla, CA (US)

(72) Inventors: Scott A. Moser, La Jolla, CA (US); Carlos Francisco Montoya-Mejia, Spring Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/647,680

(22) Filed: Jul. 12, 2017

(65) Prior Publication Data

US 2017/0318139 A1    Nov. 2, 2017

Related U.S. Application Data

(60) Division of application No. 15/422,415, filed on Feb. 1, 2017, now Pat. No. 9,794,386, which is a (Continued)

(51) Int. Cl.
*H04M 1/00* (2006.01)
*H04M 1/19* (2006.01)
(Continued)

(52) U.S. Cl.
CPC .............. *H04M 1/19* (2013.01); *G10K 11/04* (2013.01); *H04M 1/035* (2013.01); *H04M 1/05* (2013.01); *H04R 1/083* (2013.01)

(58) Field of Classification Search
CPC .......... H04M 1/19; H04M 1/035; H04M 1/05; H04R 1/083; G10K 11/04
See application file for complete search history.

(56) References Cited

U.S. PATENT DOCUMENTS

| | | |
|---|---|---|
| 4,439,644 A | 3/1984 | Bruney, III |
| 4,782,527 A | 11/1988 | Willimason |

(Continued)

*Primary Examiner* — Tuan D Nguyen
(74) *Attorney, Agent, or Firm* — Buche & Associates, P.C.; John K. Buche; Bryce A. Johnson

(57) ABSTRACT

The disclosed technology contemplates use of a communication device in public without a user's voice being overheard by the public. In certain situations, public use of a communication device, even when the conversation is private, may not be appropriate. So, a preferred embodiment of the disclosed technology involves a system of enabling or disabling a communication device. Some embodiments may include computer hardware and memory with voice-recognition software that is configured to receive a user's spoken voice during a test conversation, analyze the voice for its hertz spectrums evident in the test conversation, and subsequently employ the data during active noise cancelation. Suitably, this voice recognized noise cancelation or active noise cancelation via voice algorithm can be used to actively noise cancel a user's voice in a manner that is specifically tailored to the user by directing the sound source to provide an inverted signal that is 180 degrees out of phase with the user's actual voice. In one embodiment, the voice algorithm allows a digital CPU to anticipate the manner, including tonality, rhythm, and cadence, of a user's speaking and predict an appropriately inverted signal so that noise is substantially canceled.

2 Claims, 31 Drawing Sheets

Related U.S. Application Data continuation-in-part of application No. 15/364,254, filed on Nov. 29, 2016, now Pat. No. 9,614,945, and a continuation-in-part of application No. 14/577,839, filed on Dec. 19, 2014, now Pat. No. 9,576,567, said application No. 15/364,254 is a continuation-in-part of application No. 14/979,265, filed on Dec. 22, 2015, now Pat. No. 9,525,765, which is a continuation-in-part of application No. 14/943,856, filed on Nov. 17, 2015, now Pat. No. 9,386,135, and a continuation-in-part of application No. 14/740,129, filed on Jun. 15, 2015, now Pat. No. 9,253,299, and a continuation-in-part of application No. 14/577,839, filed on Dec. 19, 2014, now Pat. No. 9,576,567, said application No. 14/943,856 is a continuation-in-part of application No. 14/740,129, filed on Jun. 15, 2015, now Pat. No. 9,253,299, which is a continuation-in-part of application No. 14/577,839, filed on Dec. 19, 2014, now Pat. No. 9,576,567, which is a continuation-in-part of application No. 14/280,523, filed on May 16, 2014, now Pat. No. 8,948,411.

(60) Provisional application No. 61/949,239, filed on Mar. 7, 2014, provisional application No. 61/949,234, filed on Mar. 6, 2014, provisional application No. 61/941,306, filed on Feb. 18, 2014.

(51) Int. Cl.
*G10K 11/04* (2006.01)
*H04M 1/03* (2006.01)
*H04M 1/05* (2006.01)
*H04R 1/08* (2006.01)

(56) References Cited

U.S. PATENT DOCUMENTS

| | | |
|---|---|---|
| 4,805,728 A | 2/1989 | Carter |
| 6,308,609 B1 | 10/2001 | Davies |
| 7,073,426 B1 | 7/2006 | White |
| 7,298,859 B1 | 11/2007 | Worley |
| 7,564,968 B2 | 7/2009 | Ayers |
| 2003/0135771 A1* | 7/2003 | Cupps .................. G06F 1/1626 713/320 |
| 2006/0293092 A1 | 12/2006 | Hawker |
| 2009/0169041 A1 | 7/2009 | Zurek |

* cited by examiner

SYSTEM OF ENABLING OR DISABLING A COMMUNICATION DEVICE AND RELATED METHODS

CROSS-REFERENCE TO RELATED APPLICATIONS

This application is a divisional of U.S. application Ser. No. 15/422,415 (filed Feb. 1, 2017. U.S. application Ser. No. 15/422,415 is a continuation-in-part ("CIP") of U.S. patent application Ser. No. 15/364,254 (filed Nov. 29, 2016) for "Anti-Noise canceling headset and related methods."

This application is also a continuation-in-part of U.S. patent application Ser. No. 14/577,839 (filed Dec. 19, 2014) for "Ergonomic tubular anechoic chambers for use with a communication device and related methods."

U.S. patent application Ser. No. 15/364,254 is a continuation in part of U.S. patent application Ser. No. 13/979,265 (filed Dec. 22, 2015).

U.S. patent application Ser. No. 13/979,265 (filed Dec. 22, 2015) is a CIP of U.S. patent application Ser. No. 14/943,856 (filed Nov. 17, 2015), Ser. No. 14/740,129 (filed Jun. 15, 2015), and Ser. No. 14/577,839 (filed Dec. 19, 2014).

U.S. patent application Ser. No. 14/943,856 (filed Nov. 17, 2015) is a CIP of U.S. patent application Ser. No. 14/740,129 (filed Jun. 15, 2015) and Ser. No. 14/577,839 (filed Dec. 19, 2014).

U.S. patent application Ser. No. 14/740,129 (filed Jun. 15, 2015) is a CIP of U.S. patent application Ser. No. 14/577,839 (filed Dec. 19, 2014).

This application is also a CIP of U.S. patent application Ser. No. 14/577,839 (filed Dec. 19, 2014) for "Ergonomic tubular anechoic chambers for use with a communication device and related methods."

U.S. patent application Ser. No. 14/577,839 is a CIP of U.S. patent application Ser. No. 14/280,523 (filed May 16, 2016) and claims the benefit of U.S. Prov. Pat. App. Ser. Nos. 61/949,239 (filed Mar. 7, 2014), 61/949,234 (filed Mar. 6, 2014), and 61/941,306 (filed Feb. 18, 2014).

U.S. patent application Ser. No. 14/280,523 (filed May 16, 2016) is now U.S. Pat. No. 8,948,411 and claims the benefit of U.S. Prov. Pat. App. Ser. Nos. 61/949,239 (filed Mar. 7, 2014), 61/949,234 (filed Mar. 6, 2014), and 61/941,306 (filed Feb. 18, 2014).

All of the documents referenced in this section of "CROSS-REFERENCE TO RELATED APPLICATIONS" are hereby incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of communication headsets. More specifically, the subject matter of this paper is in the field of communication headsets that conceal sounds made by the wearer. This paper may also disclose headset structures that are ergonomical or otherwise comfortable to the wearer. The subject matter of this written description is further in the field of devices for containing, absorbing and directing noise from a sound source while deflecting, absorbing and reflecting ambient noise. The subject matter of this disclosure is also in the field of systems and methods for maintaining privacy or avoiding public disruption during use of a communication device such as a telephone, mobile phone, two-way radio, and the like.

Background of the Invention

Mobile and fixed line communication devices ("communication devices"), such as cellular phones, two-way radios, or home phones, have become ubiquitous. In fact, some reports show telephone use by eighty seven percent of the global population. The commonality of these devices has resulted in their public use within the local vicinity of others. Conventional communication devices are not always suitable for public use. First, use of a conventional communication device in public often requires the user to expose the private details of a communication to others within the local vicinity. Even when a user retreats to a secluded location, the communications are subject to eavesdropping (e.g., by parabolic microphone, binoculars for lip reading, laser sound pick-up devices, and other distance eavesdropping devices). Subjecting the details of a secret or private communication to others is particularly concerning when such details involve matters of national security (e.g., details concerning FBI, CIA, diplomats, fire station, police, or military matters). Second, ambient noises in public areas can frequently disrupt a communication. For instance, ambient noise can frequently make it difficult for the user of the communication device to receive clear communications on the communication devices or to speak understandable commands to a device's computer assistant employing voice recognizing software (e.g., SIRI® as utilized by the iPhone®). Thus, a need exists for apparatus and related methods for maintaining the privacy and clarity of communications over communication devices while avoiding the disturbance of others in the vicinity.

In view of the foregoing, many have proposed apparatus for enhancing privacy and clarity of communication devices while avoiding the disturbance of others nearby. These proposed apparatus involve covering the mouth or ear with a communication device so that a chamber is created over the mouth or ear in an attempt to confine the communicative sounds while blocking ambient noise. For instance, U.S. Pat. No. 7,564,968, US. Pub. App. No. 2011/0136535, U.S. Pat. No. 7,197,140, U.S. Pat. No. 8,778,062, and U.S. Pat. No. 7,515,708 disclose apparatus that are positioned over or in front of a mouth. Although capable of limited muffling of communicative sounds produced by the user of a communication device, these devices are not capable of capturing all of the communicative sounds of a device user that would otherwise be intelligible to those in the nearby vicinity. While some of these devices are capable of blocking small amounts of the direct field of communicative sounds, they are frequently inadequate for containing the more intense reverberant fields of the human speech sounds, for example, the reverberant fields of a male voice can be as low as eighty Megahertz (MHz). This functional inadequacy is the result of two factors. First, the materials (or lack thereof) employed are not capable of absorbing enough of the communicative sound to render the communication unintelligible to eavesdroppers. Second, the chambers are not air-tight (particularly at any interface between the apparatus and the user's face (specifically, the ear and mouth)). When a chamber and related parts of the device are not air-tight, the direct or reverberant fields of the near-field (sounds in close proximity to the sound source) communicative sound (which is an acoustic sound wave through air) can leak out from the chamber before being totally absorbed by the chamber walls. Even when such apparatus initially form a seal around the mouth of a user, these seals can be upset by either (1) the sound air pressure or acoustic particle velocity of the communicative sound's near field sound energy (which are much more extreme than direct or reverberant fields) or (2) misalignment of the mouth and chamber near the upper and lower lips (i.e., the menton-subnasale length, bitragoin-subnasale arc area, and bitragoin-menton arc area) during movements of a user's face during normal speech. Misalignment along the menton-subnasale length, bitragoin-subnasale arc area, and bitragoin-menton arc area is particularly problematic when an apparatus must simultaneously provide mouth and ear coverings during use because these devices allow the ear coverings to operate despite misalignment along the menton-subnasale length area, bitragoin-subnasale arc area, or bitragoin-menton arc during movements of a user's face whereby a user may not even realize that sound from a private communication is being released. Even the slightest release of sound can be concerning during extremely sensitive communications over a communication device, for instance, during doctor-patient communications, lawyer-client communications, stockbroker-investor communications, interfamily communications, or communications involving national security. Furthermore, these devices are not substantially available for blocking ambient noise and thus clarity of communication using these devices can be compromised.

Other apparatus for enhancing privacy or clarity of communication involve a user facemask for creating a chamber over the mouth of a user. See, e.g., US Pub. Pat. No. 2007/0127659, U.S. Pat. No. 8,234,944, U.S. Pat. No. 7,783,034, and CN Pat. No. 2262732. However, these types of apparatus suffer from the drawbacks mentioned above, with the additional problem of being attention calling. Frequently, participants of a private communication, like national security agency members, do not want additional attention drawn to them by their communication device during sensitive telephone communications. Additionally: none of these facemask apparatus allow the user to breath freely while being used without taking the device away from their face; none of the prior art have a controlled direction of airflow with sound energy to exit out the device in a controlled manner, with the users air from speech passing across a microphone without the intake air passing by the microphone so no acoustic interference will occur with the microphone; and none of the prior art use materials that are technically able to absorb the low base frequencies i.e. modelling clay that does not dry out and remains malleable.

SUMMARY OF THE INVENTION

In view of the foregoing, it is an object of this disclosure to describe an apparatus for maintaining the privacy and clarity of communications over devices and sounds of musical instruments or voices. It is another objective to disclose such apparatus without the drawbacks identified above. Disclosed, in general, are devices that provide a substantially air-tight chamber over a sound source while absorbing relatively all frequency fields of speech, singing, or instrument sounds from the sound source. In some embodiments, active noise control or active noise cancelation means ("ANC means") are provided to the device. Said means include a sound source for the addition of sound specifically designed to cancel noise within the anechoic chamber. Although it may be difficult to accept that adding two sounds 180 degrees out of phase can result in zero sound, it is important to remember that sound is a compression wave that compresses to an amount greater than normal air pressure. There are so many frequencies in sound, it is impossible to cancel them all out. A preferred embodiment of the disclosed system features an electronic system that selects a narrow band of frequencies to cancel them using a DSP (Digital Signal Processor). Suitably, the DSP does not result in one hundred percent (100%) cancellation of noise, but other sound absorption from the anechoic chamber or other components can block sounds at other frequencies.

In general, the devices feature: anechoic chambers that are configured to receive a sound source in an air-tight manner; ANC means (e.g., a DSP) for reducing unwanted sound by the addition of a second sound within said anechoic chambers; and anechoic channels that are in fluid communication with the ambient environment. Preferably, the anechoic channels allows air flow out of the anechoic chambers. Suitably, the anechoic chambers are adapted to capture air containing sound energy generated by the sound source (e.g., human voice), and distribute the air about internal anechoic acoustical surface areas on the inside of the chambers, wherein the internal surface areas are maximized and sufficiently large to dampen or otherwise absorb the sound energy. The amount of sound energy absorbed by the anechoic chambers can be reduced via the presence of an ANC means (like an antiphase/anti-noise speaker) for reducing the sound energy in the captured air by providing the addition of a second out of phase sound to within the anechoic chamber. Placement of a user's face inside the sealed area also acts to absorb sound waves in the anechoic chamber. Preferably, the deenergized air is directed from the near-field anechoic sound chamber through a Helmholtz resonator or other tubular anechoic channel extending therefrom to the ambient atmosphere to further dampen or absorb and contain the sound energy. Once sound energy is absorbed from the anechoic chambers, the air preferably exhausts from the apparatus substantially free of any sound energy. This feature permits a user to pass fresh air into the chamber via an air intake mechanism without pressure buildup as the user's sound containing air is vented out of the anechoic channel or Helmholtz resonator. The Helmholtz resonator design preferably "tunes" the exhaust air so the voice energy sound that leaves is less than 100 hz (i.e., just below the hearing threshold). In one configuration, the outer wall of the apparatus is configured to reflect ambient sounds. In another embodiment, the apparatus features an ear sealed chamber to keep ambient sounds out of a user's ear.

It is yet a further objective to disclose devices that provide an air-tight chamber over the mouth and ear of a user while absorbing all megahertz frequency fields of communicative sounds by male and female speakers. In one embodiment, the device is defined by: an anechoic chamber with a mouth opening plus an anechoic channel for dampening acoustics about a receiver portion of a communication device; an antiphase/anti-noise speaker disposed within the anechoic chamber; and an ear chamber with an ear opening dampening acoustics about a microphone of a communication device. In a preferred embodiment, the device features electronics software on a printed circuit board (PCB), which measures the sound of a user's voice in decibels (dB) via a microphone and creates an antiphase noise to cancel the sound of the user's voice at substantially the exact same volume (dB) level as the speaker's voice in substantially real-time (the best as the software can interpret the speech sounds and create antiphase sound waves). In a preferred embodiment, the ear and anechoic chambers are configured for placement so that the device lies along the mentocervical angle, mentocervical angle length, menton-subnasale length, bitragoin-subnasale arc, or bitragoin-menton arc of a user at a range of nineteen to twenty three degrees. Other embodiments may not incorporate these angles. In use, a mouth may be placed in the mouth opening to create a substantially air-tight seal and position the mouth so that the acoustics of a communicative sound from the mouth are directed toward the receiver portion of the communication device within the anechoic chamber. By allowing the specific ergonomic design of the mouth seal to push easily into the soft tissue of a user's face around the user's teeth, a substantially air-tight seal is created that does not hinder the user's ideal pronunciation and intonation of verbs, adjectives, pronouns and other words. In a preferred embodiment, air from the user's breath during speech is directed through the anechoic channel for improved acoustic absorption and microphone sound pick-up. The result is voice communication being contained within the anechoic chamber of the device for maintaining privacy of the phone conversation.

Preferably, the apparatus is configured to fit securely over the ear and mouth of a user, without breaking the air tight seal between the mouth opening and mouth of a user and the seal between the ear opening and the ear of a user. Suitably, this is accomplished via positioning the apparatus at a metocervical angle in a range of fifteen and twenty five degrees relative to the face of a user. Other embodiments need not incorporate these angles. A preferable metocervical angle position for the apparatus is about nineteen degrees for female users and about twenty three degrees for male users. These metocervical angle positions result in the appropriate ear to mouth engagement at an eighty-eighth percentile relationship for both of the bitragion sub-nasale arc and the bitragion-menton arc anthropometric measurements. This insures even/equal user pressure around the entire menton subnasale area (i.e., direct contact area of the entire perimeter of the product's face sound seal) and the center of the ear.

It is yet a further objective of the invention to disclose a device that works in conjunction with a phone and provides a substantially air-tight chamber over a sound source while absorbing relatively all frequency fields of speech from the sound source. In an alternative embodiment, the phone features: hollow chambers that reduce noise by allowing expanding sound waves to be decelerated and cooled, allowing the sound waves to be greatly reduced in velocity, which produces less noise signature.

Finally, it is an object of the disclosure to describe a telephone handset that features an antiphase/anti-noise speaker within an anechoic chamber so that noises provided therein can be combatted with antiphase noises. In some embodiments, the antiphase/anti-noise speaker can be a DSP. In some embodiments, the headset is designed to include passive and active noise cancelation of a user's voice. Suitably, the headset can be adjusted to fit an inclusive range of head dimensions comfortably, the headsets may connect wirelessly to the user's phone to ensure cable free operation and communication.

Other objectives and desires may become apparent to one of skill in the art after reading the below disclosure and viewing the associated figures. Also, these and other embodiments will become apparent from the drawings.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed, in general, are devices that provide an air-tight chamber over a sound source while trapping, containing, absorbing, directing and deflecting all fields of sounds from the sound source (e.g., the mouth of a human or a woodwind instrument). In general, the devices feature: a specialized anechoic chamber that is configured to receive a sound source in an air-tight manner; and a specialized anechoic channel that is in fluid communication with the ambient atmosphere. Suitably, the anechoic chamber is adapted to capture air containing sound energy generated by the sound source, and distribute the air about an internal surface area on the inside of the chamber, wherein the internal surface area is sufficiently large to dampen or otherwise absorb the sounds energy. Preferably, the air is directed from the anechoic chamber through an anechoic tubular channel extending therefrom to the ambient to further dampen or absorb the sound energy. In one configuration, the outer wall of the apparatus is configured to reflect ambient sounds. The more specific details of the preferred embodiment are disclosed in connection with the figures.

By allowing the specific ergonomic design of the mouth seal to push easily into the soft tissue of a user's face around the user's teeth, a substantially air-tight seal is created that does not hinder the user's ideal pronunciation and intonation of verbs adjectives, pronouns and other words easily without stress on the areas of the lips used for pronunciation. Preferably, the apparatus is configured to fit securely over the ear and mouth of a user, without breaking the air tight seal between the mouth opening and mouth of a user and the seal between the ear opening and the ear of a user. Suitably, this is accomplished via positioning the apparatus at a metocervical angle in a range of fifteen and twenty five degrees relative to the face of a user. A preferable mento-cervical angle position for the apparatus is about nineteen degrees for female users and about twenty three degrees for male users. These metocervical angle positions result in the appropriate ear to mouth engagement at an eighty-eighth percentile relationship for both of the bitragion sub-nasale arc and the bitragion-menton arc measurements. This insures even/equal user pressure around the entire menton subnasale area (i.e., direct contact area of the entire perimeter of the product's face sound seal) and the center of the ear.

Figure 1:
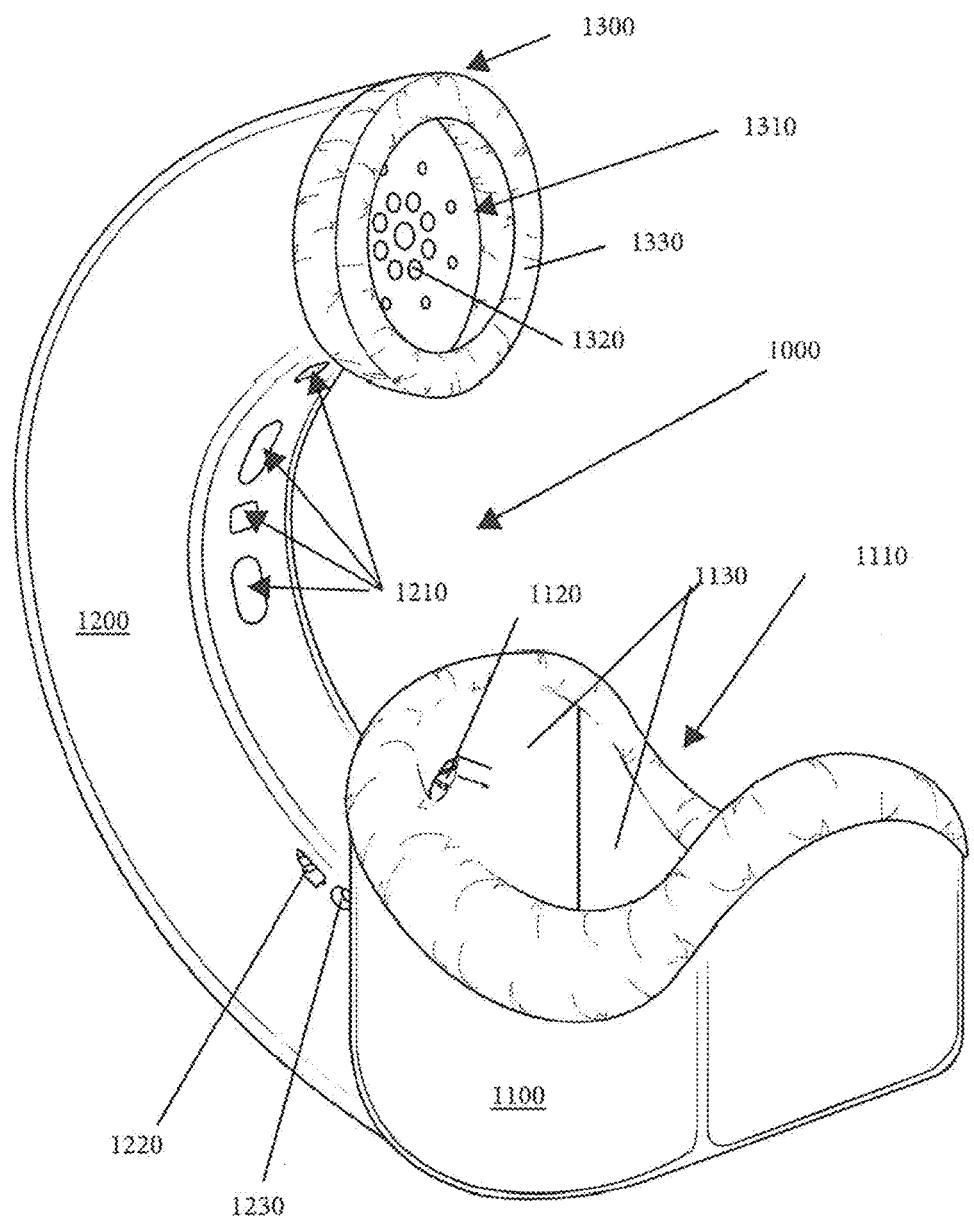
FIG. 1 is a perspective view of an anechoic device.

FIG. 1 is a perspective view of an apparatus 1000 for maintaining the privacy and clarity of communications made over a communication device. As shown, the apparatus 1000 is generally in the shape of a telephone handset and defined by: (1) an anechoic chamber 1100 with a mouth opening 1110 for engaging a mouth of a user; (2) a handle 1200; and, (3) an ear chamber 1300 with an ear opening 1310 for engaging the ear of a user.

As shown in FIG. 1, the handle 1200 is generally curved wherein: an anechoic chamber 1100 is generally positioned at the lower end of the handle 1200; and the ear chamber 1300 is positioned at an upper end of the handle. Both the anechoic chamber 1100 and the ear chamber 1300 generally define basins at either end of the handle 1000. The specifically designed anechoic chamber 1100 preferably features contours 1130 on its inner walls and cushioning 1140 around the lip of the mouth opening. Similarly, the ear chamber features cushioning 1330 around the lip of the ear opening 1310. Finally, the handle 1200 is configured with a curve so that it can be gripped by the hand of a user while the ear and anechoic chambers are simultaneously positioned over the ear and mouth. In a preferred embodiment, the handle has a curvature and shape of a banana fruit for the ergonomic use and comfort of a user. Although not shown, the handle 1200 may further feature grips to assist users with arthritis afflictions in holding the apparatus 1000.

As discussed in greater detail below, the apparatus 1000 is designed to receive and transmit telephone communications from and to a communication device (e.g., wirelessly via Bluetooth® type technology) or wired communication device (e.g., landline phone) and generally be operated in the manner of a telephone handset. For this reason, FIG. 1 depicts an air inlet 1120 within the anechoic chamber 1100. As discussed in greater detail below, the vent 1120 suitably features a triple layer air seal design that blocks ambient sounds from entering the anechoic chambers during a user's speech and that easily flexes under a negative pressure within the chamber 1100 to allow sufficient air into the chamber 1100 during speech. In other words, the vent 1120 makes it so the user does not have to pull away from the apparatus 1000 to breathe during use. Also depicted are (a) phone controls 1210 (e.g., volume and accept or decline buttons, hold button, or mute speaker button) on the handle 1200, power ports 1220 on the handle 1200, an audio port 1230 (e.g., for receiving a headphone jack), and speaker holes 1320 within the ear chamber 1300. In a preferred embodiment, the phone controls 1210 include a hold or mute button that will allow the user essentially turn off the phone when not engaged against the user's face to shield the listening party from the ambient noise or discussion of the user.

Figure 2:
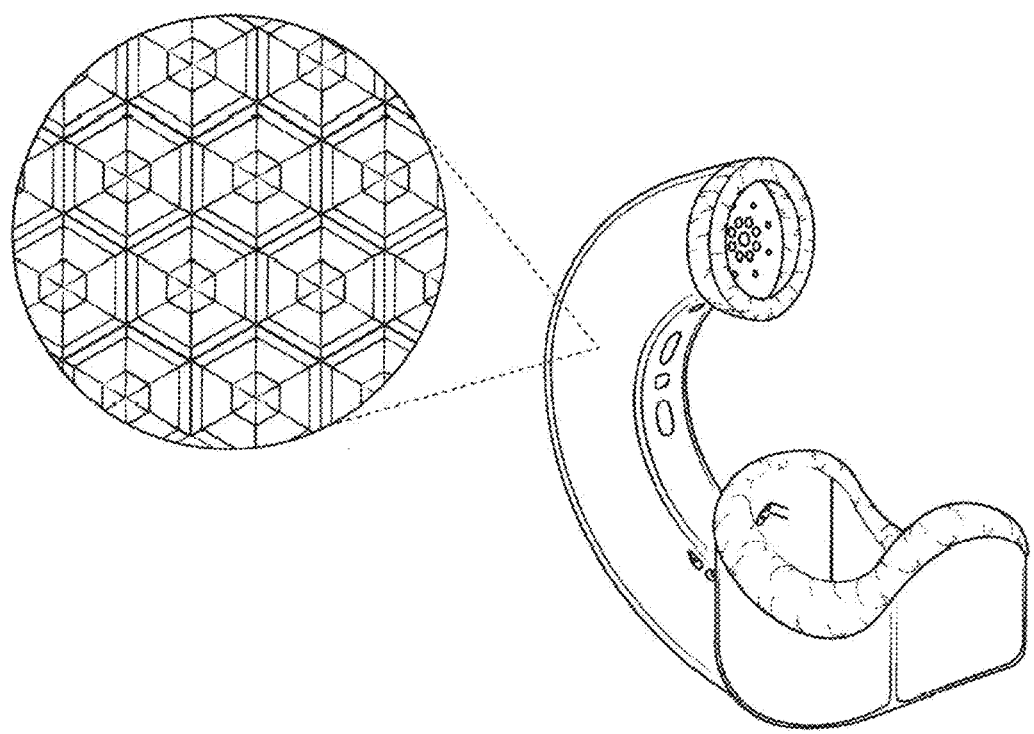
FIG. 2 is a perspective view of the device of FIG. 1 with a blow-out depicting the sound reflecting surface contours of the device.

FIG. 2 is a recreation of the perspective view of the apparatus 1000 FIG. 1, with an additional blow-out view to illustrate the external surface of the apparatus 1000. As shown in the blow-out view, the external surface of the apparatus is defined by a hex-skin or a plurality of hexagonal tiles positioned in an array over the surface of the apparatus 1000. In a preferred embodiment, each hexagon defines a plane or face for reflecting ambient sound energy, wherein each plane or face is angled on a lightly different angle relative to the plane of any adjacent hexagon within the skin.

This angular offset from polygonal shapes results in ambient sound deflection to maintain the quality of sounds within the apparatus. Suitably, this angular offset weakens the ambient sound's intensity by not allowing sound energy to focus on a specific area on the surface of the outside of the anechoic chamber 1100. In a preferred embodiment, the surface of each hexagon is contoured to further disrupt ambient sounds via minimal absorption and deflection so that large focused sound energy cannot enter the anechoic chamber. Other polygonal patterns may be integrated.

Figure 3:
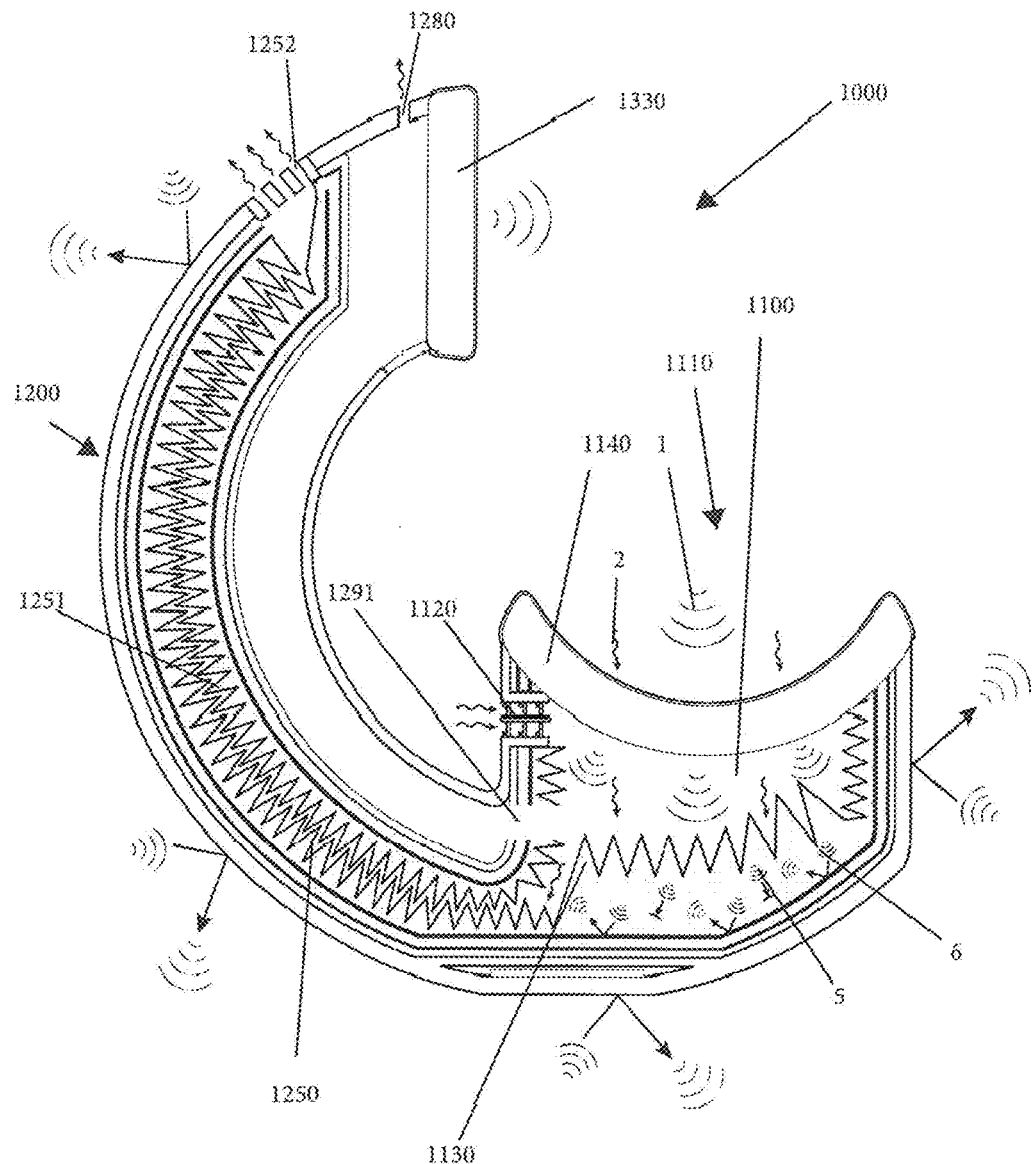
FIG. 3 is a cross section of an apparatus for ensuring the privacy and clarity of communications over communication devices.
Figure 4:
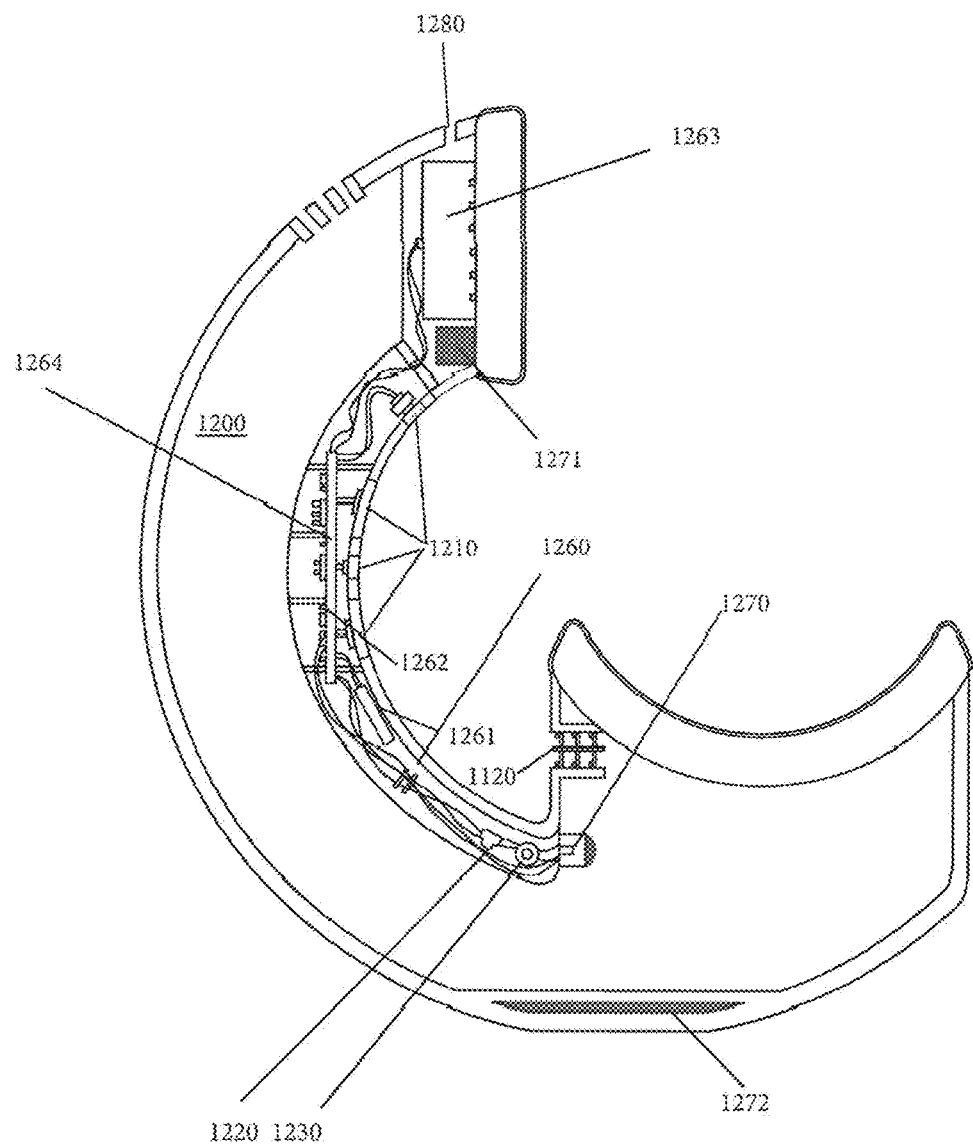
FIG. 4 is a cross section of the shell of the device showing isolated anechoic chambers separate from the electric components.

FIGS. 3 and 4 are cross-sections of the apparatus 1000 depicted in FIG. 1. These cross-sections are intended to illustrate the interior workings of the claimed device. Specifically, FIG. 3 illustrates the inner workings of the sound trapping, containing, absorbing, directing and deflecting components of the apparatus 1000 and FIG. 4 illustrates the electrical components for telephonic communications. Referring to both FIGS. 3 and 4, the phone electronics are, (apart from a microphone 1270) disposed within the acoustic chamber, and preferably isolated from sound absorbing components to ensure the sound components create a substantially or completely air-tight environment. As noted below in greater detail, the vent 1120 (FIG. 3) is positioned relative to the microphone 1270 (FIG. 4) so that flowing air upon fresh air-intake does not cause interference with the microphone 1270. Additionally, the vent 1120 should be flush with the external surface and positioned in the middle of the apparatus 1000 so that, when facing sound, the vent does not provide energy that may be reflected.

Referring first to FIG. 1 and FIG. 3, sound may be captured and/or absorbed or directed from the flow of air caused by speech during use of the apparatus 1000. In a preferred embodiment, sound energy 1 is captured or absorbed via the anechoic chamber 1100 and the anechoic channel 1250 disposed within the handle 1200. Suitably, the anechoic chamber 1100 is adapted to capture air 2 containing sound energy generated by a sound source (not shown), and distribute the air 2 over the inner surface of the chamber 1100 and through the anechoic channel 1250 (i.e., the channel 1250 provides fluid communication between the anechoic chamber 1100 and the ambient). The amount of air 2 being passed over the vocal cords is directly proportionate to voice sound volume.

Still referring to the same figures, the anechoic chamber 1100 features a vent 1120. The vent 1120 is provided so that (a) air may be supplied to the user without disengaging the device from the users face mouth and ear whereby a substantially air-tight seal may remain between the anechoic chamber 1100 and a user's face. The vent 1120 opens under negative pressure within the chamber. The vent 1120 closes under the positive pressure caused by a sound source within the chamber 1100. This inlet preferably allows air 2 to pass into the anechoic chamber 1100. In a preferred embodiment, the inlet is defined by a vent 1120 with triple rubber flex valves in a naturally closed position. The triple valve provides ambient sound insulation/shielding during speech. The rubber flex values easily open when a breath of fresh air is needed to breathe while speaking. As shown in FIG. 3 and FIG. 1, the anechoic chamber 1100 features contours 1130 for increasing the surface area of its internal sidewalls. Preferably, these peak contours 1130 are a specific shape to enhance the absorption of low base megahertz frequencies. Further surface area is provided via placing small holes or pores in the contours 1130. In the depicted embodiment those contours 1130 are defined by wedges or ridges. Suitably, similar pored contours 1251 may be provided to the inner walls of the anechoic channel 1250. As shown, the contours 1251 cooperate to guide energized air (energized with near field sound energy that was not absorbed or contained in the anechoic chamber 1100) over its surface area and around corners to physically make the air lose sound wave energy. In a preferred embodiment, the anechoic chamber 1100 and channel 1250 is provided with an air vent 1252 through the handle 1200 so that air that has been de-energized of sound energy may be exhausted to the ambient atmosphere. As shown, the exhausted air 2 from the vent 1252 is directed away from the ear chamber 1300 so that if any sound energy remains in the air, the remnant energy will be directed away from the ear chamber 1300 (FIG. 1) and its speaker.

Still referring to FIGS. 1 and 3, the sidewalls of the anechoic chamber 1100 and anechoic channel 1250 are configured to trap, contain, absorb, direct, and deflect sound energy from air that contacts its surface area. For this purpose, the sidewalls of the anechoic chamber 1100 and channel 1250, the sidewalls are constructed of dense open cell acoustic foam for maximum energy absorption and dissipation. When air contains large amounts of sound energy, some of that energy will inevitably propagate through materials designed to absorb the energy and potentially be released to the ambient atmosphere. In view of this fact, the sidewalls preferably feature layers with various acoustical properties (including energy densities) for further sound absorption and reflection of sound energy back toward the inside of the anechoic chamber 1200 and the user's face. These layers are depicted in FIG. 5, which is a cross section of a typical sidewall.

Figure 5:
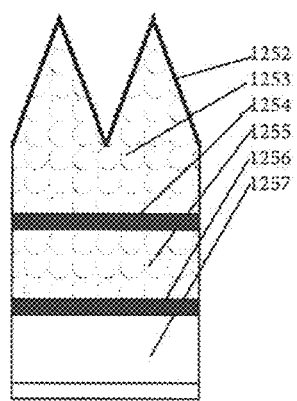
FIG. 5 is a cross section of a side wall of an anechoic chamber.

Referring to FIGS. 5 and 3, the inner walls of the anechoic chamber 1100 and the anechoic channel 1250 are suitably constructed in layers. As shown in FIG. 5: a first layer 1252 may be defined by an anti-microbial sound absorbent coating to maximize bass dampening while not allowing the surfaces in contact with the users salvia to become ridden with bacteria; a second layer 1253 comprised of dense open cell acoustic foam defining the pored contours 1130 and 1251 of the chamber 1100 and channel 1250; a third layer 1254 for defined by a composite (e.g., modeling clay that will not shrink or dry always staying permeable) or foil/metal (e.g., aluminum foil or light gauge sheet metal) for absorbing, deflecting and reflecting energy back to within the anechoic chamber and thru to the channel up to the exhaust; a fourth layer 1255 of dense open cell acoustic foam; a fifth layer 1256 of a composite or foil/metal or clay for absorbing and or reflecting energy; a sixth layer 1257 of large, open cell plastic; and the outer shell of the apparatus 1000. As shown in FIGS. 3 and 5, sound energy 5 is absorbed by the second layer 1253 and, if not, the energy 6 is reflected by the third layer 1254. The second and third layers are important to function because if energy is not adsorbed by the second layer 1253 it is reflected by the third layer 1254. The configuration of functional specific layers of coatings, open cell foam, sheet metal, modeling clay, rubber layers is specifically designed to absorb, contain, reflect and direct the different ranges of frequencies/wavelengths of the sound waves from and male and female speaking, singing and playing a musical instrument, and therefore the combination of these layers, or sets of layers (example: modeling clay backed by thin metal), work to maximize all sound energy absorption and prevent the sound energy from escaping the device.

Referring now to FIG. 4, the upper portion of the handle 1200 features a housing 1260 for retaining the electronics that enable the apparatus to be used in the manner of a telephone handset. This housing 1260 further allows for sound vibration isolation from the anechoic chambers 1100 and sub assembly for manufacturing. This configuration allows the anechoic chamber 1100 to be easily assembled in a substantially air tight manner, which may be important to operation of the device. The electronic separation is also needed to direct and expel the electronic heat from the device. As shown, the housing 1260 retains a battery 1261, a mother circuit board 1262 that is electrically coupled to the phone controls 1210 (including volume controls, on/off controls, and hold microphone button controls), a speaker 1263, a microphone 1270 that is specifically designed to function in a positive air pressure environment, and a receiver/transmitter 1264 (e.g., Bluetooth®) (which may be coupled to the mother circuit board 1262 for receiving and transmitting communications to and from a device (e.g., cell phone, two way radio, or home phone). To vent the naturally occurring build-up of heat from electronic operations, the housing 1260 is outfitted with a vent 1280 for venting heat from the housing 1260. This isolated vent 1280 also allows the devices audio speaker to naturally flex its speaker membrane for clear sound amplification. These phone electronics are configured to operate in the manner of a Bluetooth® or other wireless headset for mobile, home, or office communication devices. The jack 1230 is preferably a 3.5 mm industry standard headphone jack so the device can be wired (linked) to a cell phone without bluetooth. In such configurations the blue tooth components will either be off or not located in the device. As shown, the microphone 1270 is positioned within the anechoic chamber from the housing 1260 so that no salvia generally comes in contact with the users "salvia spray" while speaking. The microphone 1270 is also positioned so air from the intake will not cause "noise" air flow interference from incoming air when the user breathes. Suitably, the microphone 1270 is configured for use within a pressurized chamber and with an air tight seal between the anechoic chamber 1100 and the housing 1260. In other words, the microphone 1270 is specifically designed to function in a positive air pressure environment. The microphone 1270 may preferably be passed through a housing 1260 via opening 1291 (see FIG. 3). Again, this specific position allows for isolation from the majority of the sound vibrations and also to aid in sub manufacturing assembles. Finally, weights 1271 and 1272 may be positioned at the upper and lower portions of the apparatus 1000 for balance.

Figure 6:
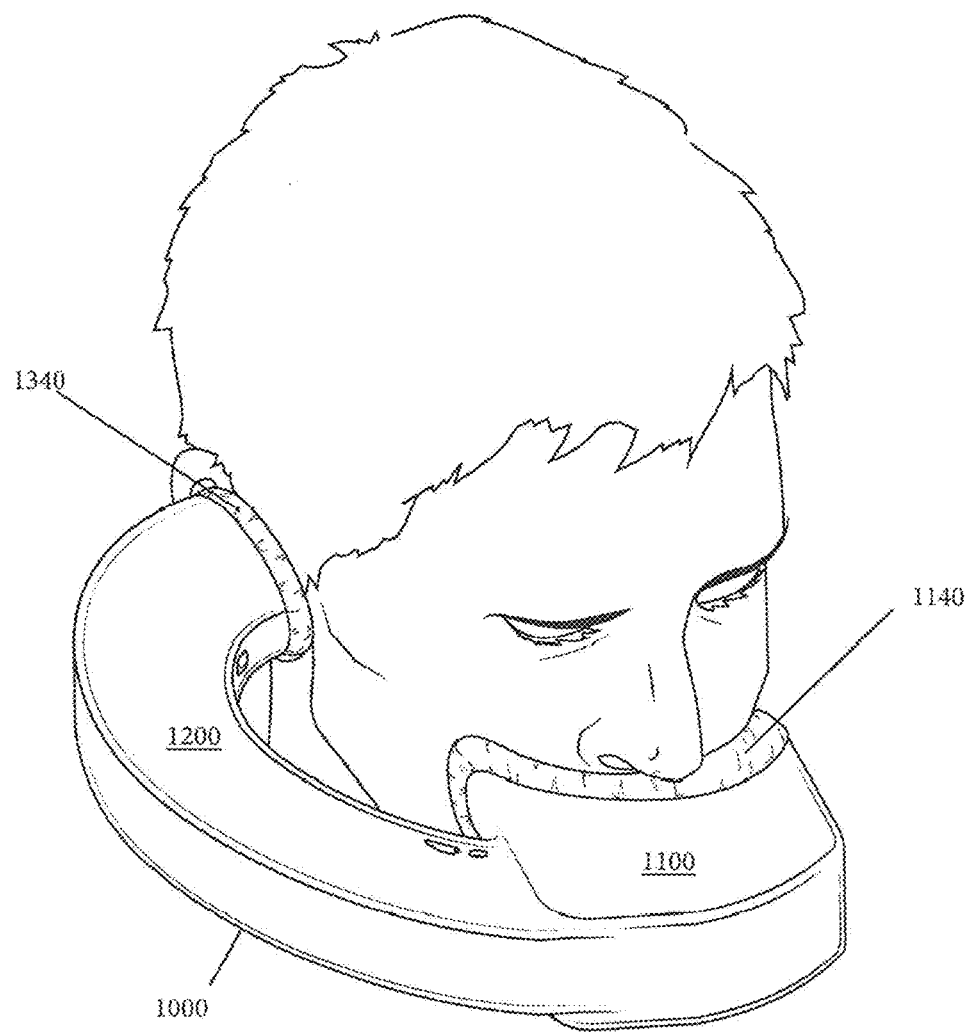
FIG. 6 is an environmental view of the device.
Figure 13:
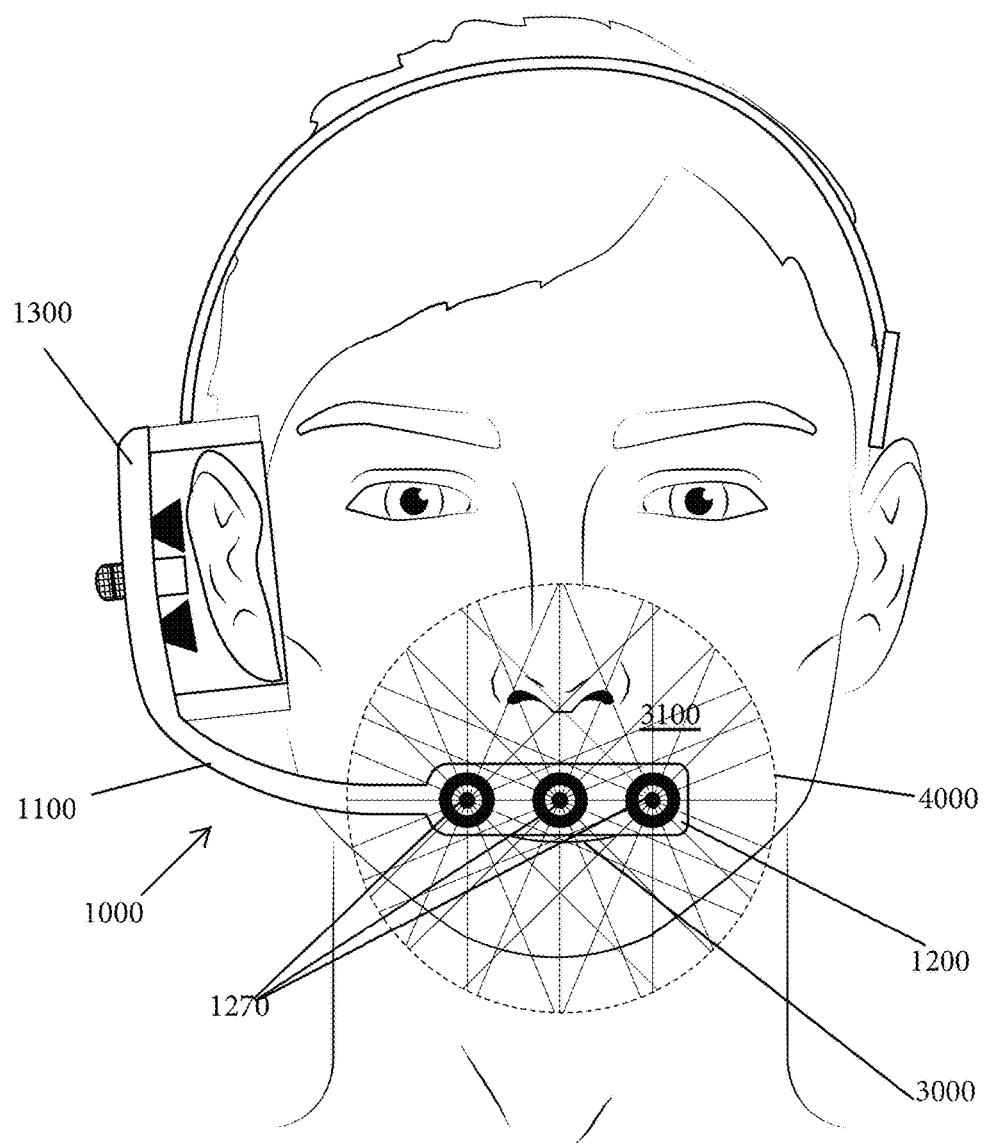
FIG. 13 is a front view of a headset.

As alluded to above, the apparatus 1000 is designed to be operated in the manner of a telephone handset. FIG. 6 shows an environmental view of the apparatus 1000 in operation. As shown, the apparatus 1000 is operated via placing (1) the mouth opening 1110 securely over the mouth of a user so that the cushioning 1140 or flexible rubber seal of the device 1000 is firmly and comfortably positioned around the mouth of the user and (2) the ear opening 1310 over the ear of a user so that the cushioning 1330 is firmly positioned around or over the ear of a user. Suitably, the anechoic chamber cushioning 1140 or flexible rubber seal is configured to act as an air-tight gasket between the interface of the mouth and anechoic chamber 1100. In one embodiment, the cushioning may be removable, disposable, and replaceable to avoid build-up of dirt, bacteria and other substances that may accumulate during use. FIG. 13 illustrates the positioning of the device 1000 over the mouth. Suitably, the mouth opening is generally mouth shaped and curved so that it may be pressed around the mouth of a user and into the soft tissue 5000 (the area indicated by dashed lines) of the face. In a preferred embodiment, the mouth opening must engage the soft tissue of the face so that the mouth piece pushes softly into the face without interfering with the lips so the user has no difficulties speaking and singing normally. This engagement creates a substantially air-tight seal around the mouth of a user and allows the ear chamber 1300 to be properly positioned over the ear. The ear chamber 1300 cushioning 1330 is configured to act as a gasket between the interface of the ear and ear chamber 1200.

Preferably, the apparatus is configured to fit securely over the ear and mouth of a user, without breaking the air tight seal between the mouth opening 1110 and mouth of a user and the seal between the ear opening 1310 and the ear of a user. Suitably, this is accomplished via positioning the apparatus at a metocervical angle in a range of fifteen and twenty five degrees relative to the face of a user. Other embodiments need not incorporate these angles. A preferable metocervical angle position for the apparatus is about nineteen degrees for female users and about twenty three degrees for male users. These metocervical angle positions result in the appropriate ear to mouth engagement at an eighty-eighth percentile relationship for both of the bitragoin sub-nasal arc and the bitragion-menton arc anthropometric measurements. This insures even/equal user pressure around the entire menton subnasale area (i.e., direct contact area of the entire perimeter of the product's face sound seal) and the center of the ear.

Figure 7:
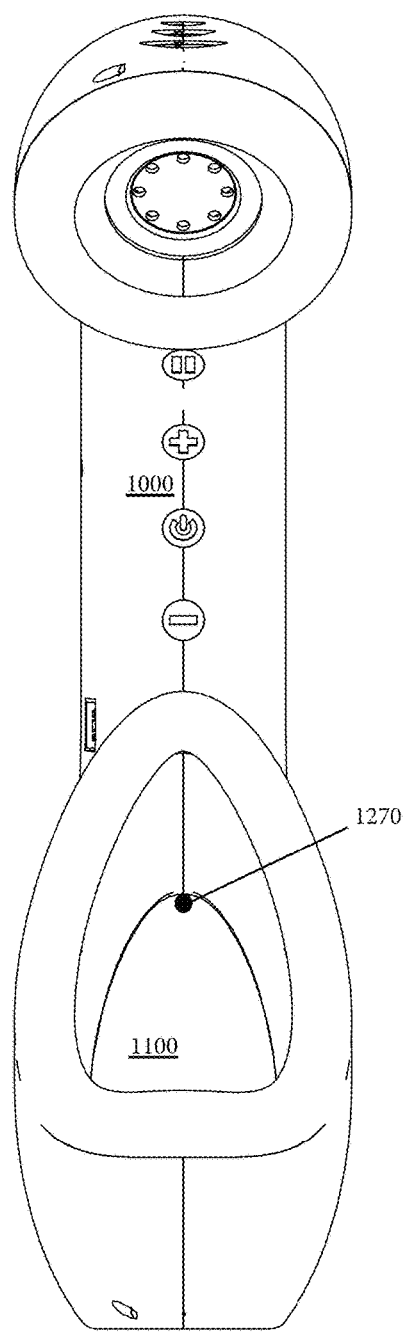
FIG. 7 is a front view of another embodiment of a device.
Figure 8:
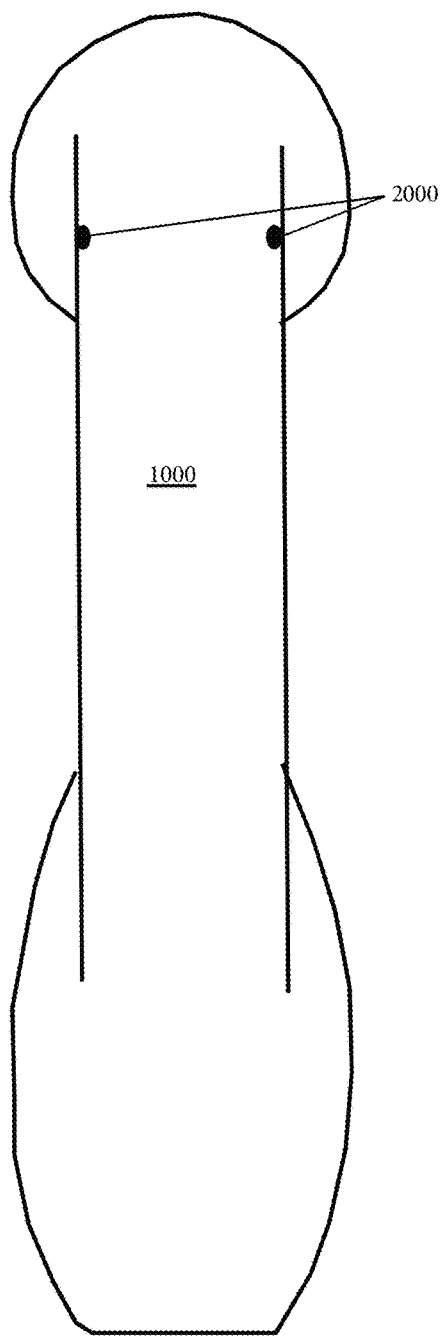
FIG. 8 is a rear view of the device of FIG. 7.
Figure 9:
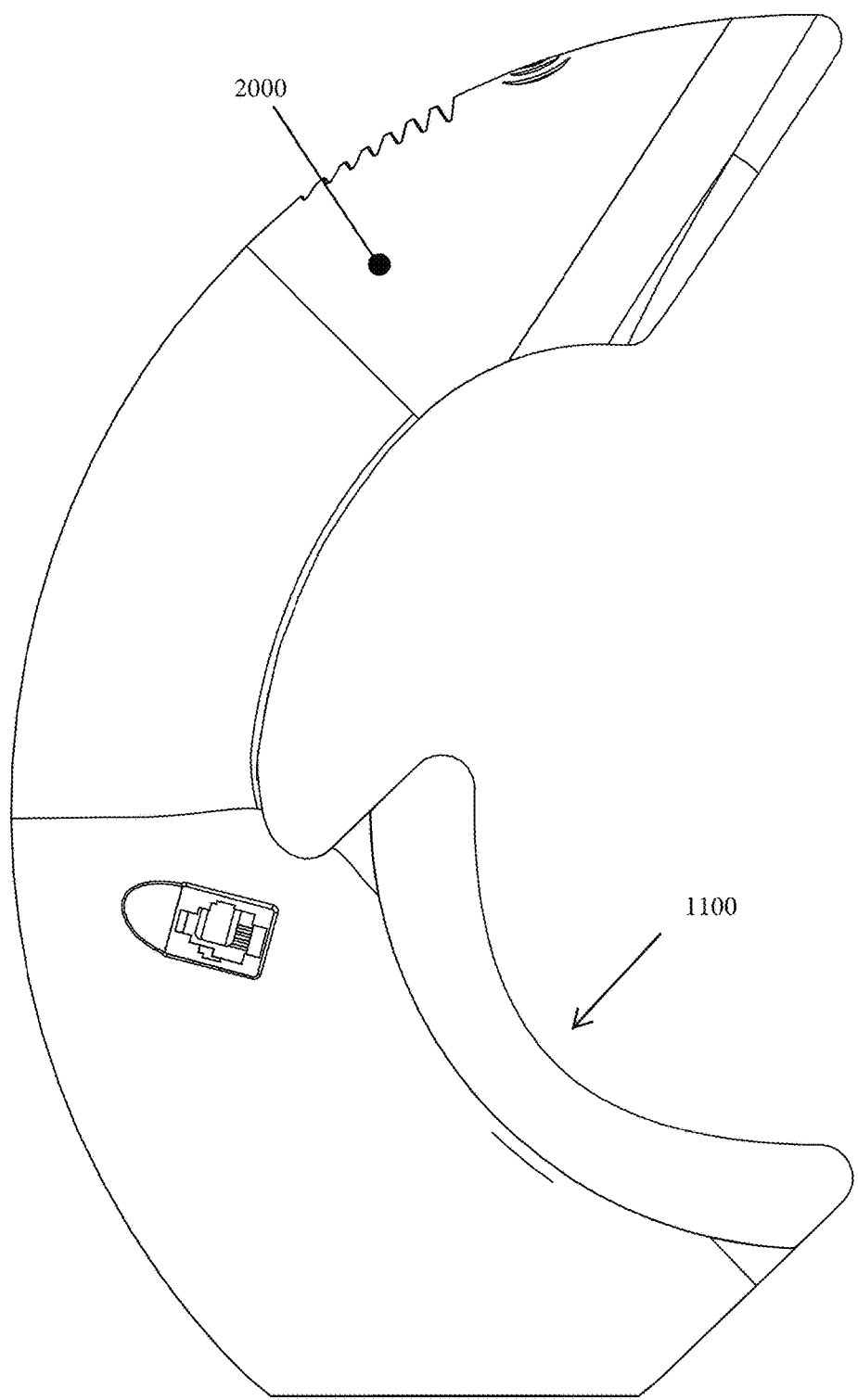
FIG. 9 is a right-side view of the device of FIGS. 7 and 8.
Figure 10:
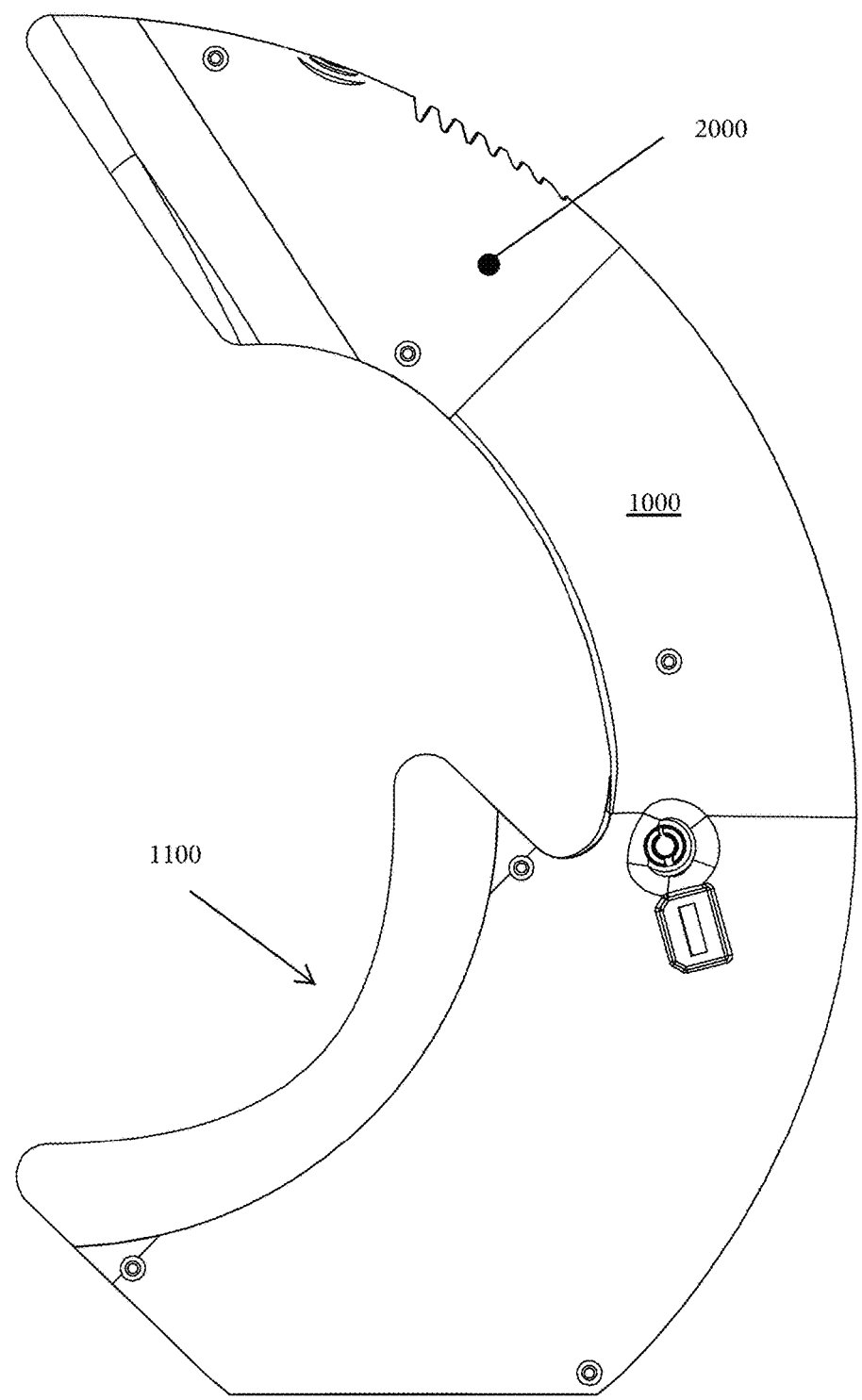
FIG. 10 is a left-side view of the device of FIGS. 7 through 9.

FIG. 7 is a front view of another embodiment of a device 1000. FIG. 8 is a rear view of the device 1000. FIG. 9 is a right-side view of the device 1000. FIG. 10 is a left-side view of the device 1000. This device 1000 differs from embodiments of the device shown in FIGS. 1 through 6 in two meaningful ways. First, the device 1000 of FIGS. 7 through 10 features an improved notification light 2000 to alert a user to the status of the device 1000. Second, the device 1000 of FIGS. 23 through 26 features active noise control or active noise cancelation means ("ANC means") 1270 inside of the device 1000. Said means 1270 includes a sound source (like an antiphase/anti-noise speaker) for the addition of sound specifically designed to cancel noise presented within the anechoic chamber 1100.

Figure 11:
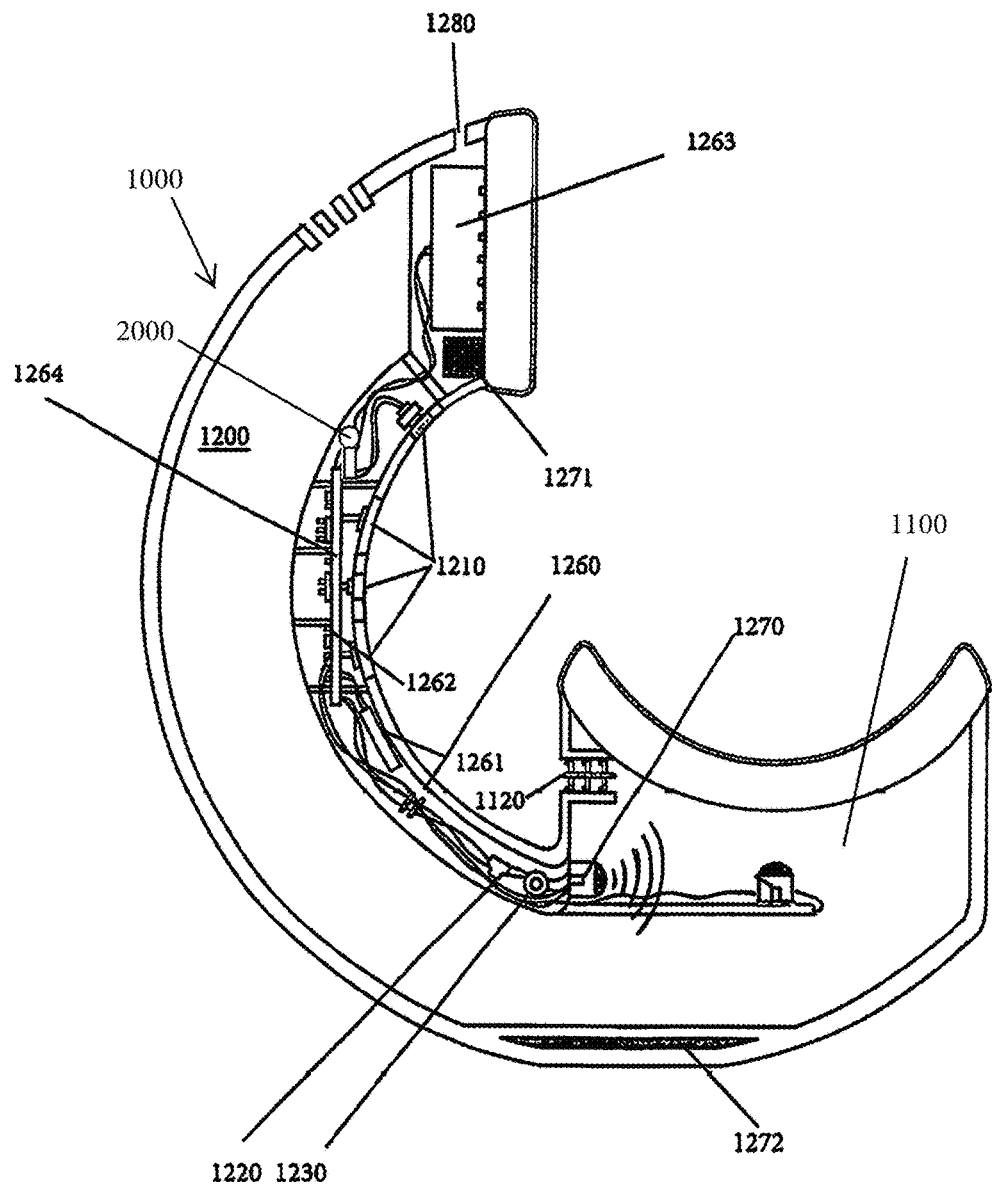
FIG. 11 is a cross section of the device of FIGS. 7 through 10.

FIG. 11 is a cross section of the device of FIGS. 7 through 10. FIG. 11 shows the internal placement of the ANC means 1270 and the light 2000 within the device 1000. As shown, the ANC means is electrically coupled to the coupled to the printed circuit board of the device 1000 so that it is positioned within the anechoic chamber 1100. The light 2000 features a light source and is also electrically coupled to the PCB of the device 1000.

Figure 12:
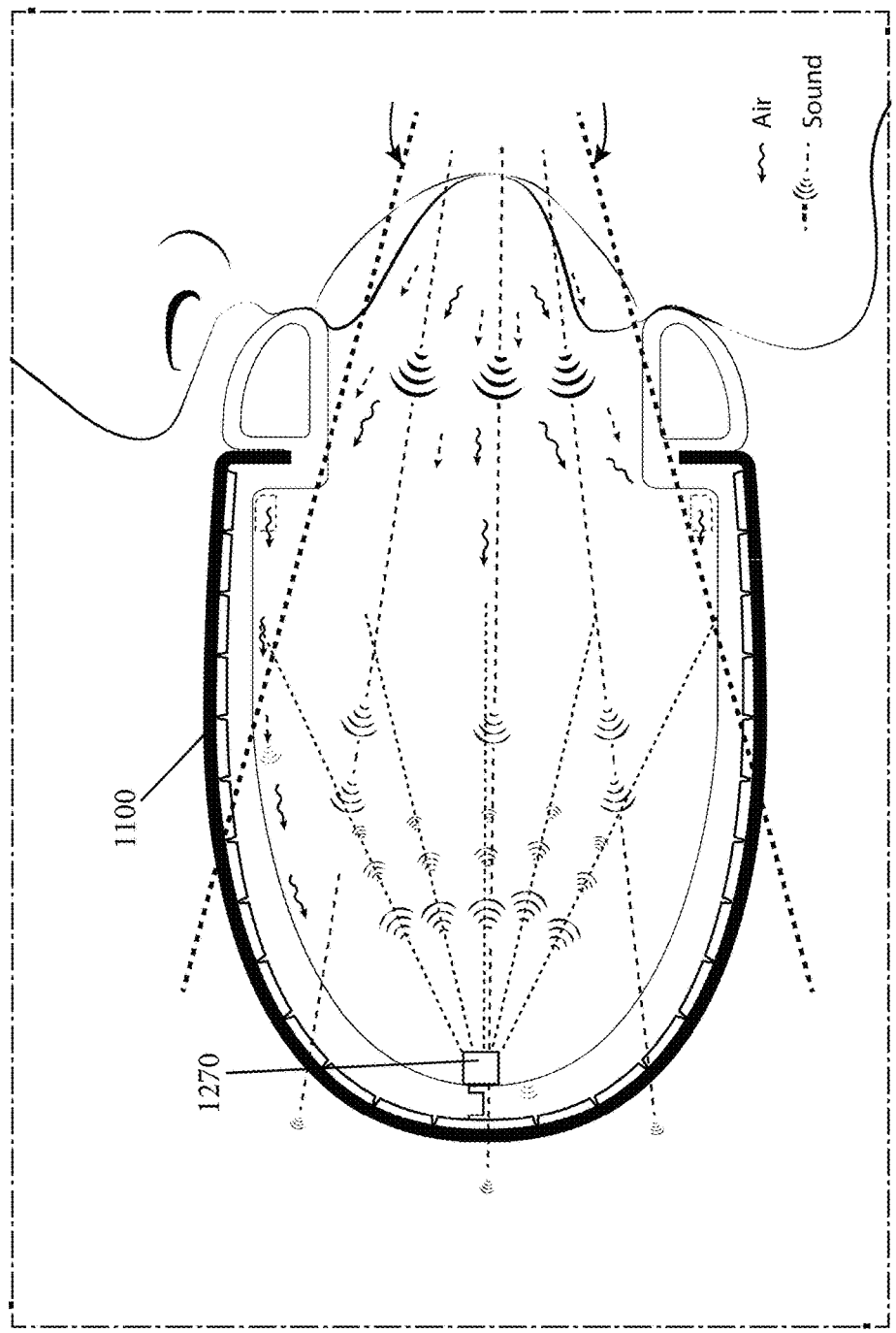
FIG. 12 is an illustration of the operations of the device of FIG. 7 through 11.

FIG. 12 is an illustration of the operations of the device 1000. As shown, ANC means 1270 are provided to the device 1000. Said means 1270 include a sound source for the addition of sound specifically designed to cancel noise outside of the anechoic chamber. Preferably, the ANC means 1270 reduces unwanted sound by the addition of a second sound within said anechoic chamber 1100. Suitably, the anechoic chambers are adapted to capture air containing sound energy generated by the sound source (e.g., human voice), and distribute the air about internal anechoic acoustical surface areas on the inside of the chambers, wherein the internal surface areas are maximized and sufficiently large to dampen or otherwise absorb the sound energy. The amount of sound energy absorbed by the anechoic chambers can be reduced via the presence of an ANC means (like an anti-phase/anti-noise speaker) for reducing the sound energy in the captured air by providing the addition of a second sound to within the anechoic chamber. Placement of a user's face inside the sealed area also acts to absorb sound waves in the anechoic chamber. In a preferred embodiment, the device features electronics software on a printed circuit board (PCB) which measures the sound of a user's voice via a microphone and creates an antiphase noise to cancel the sound of the user's voice in substantially real-time (the best as the software can interpret the speech sounds and create antiphase sound waves). In a preferred embodiment, the ear and anechoic chambers are configured for placement so that the device lies along the mentocervical angle, mentocervical angle length, menton-subnasale length, bitragoin-subnasale arc, or bitragoin-menton arc of a user at a range of nineteen to twenty three degrees. Other embodiments may not incorporate these angles. In use, a mouth may be placed in the mouth opening to create a substantially air-tight seal and position the mouth so that the acoustics of a communicative sound from the mouth are directed toward the receiver portion of the communication device within the anechoic chamber. By allowing the specific ergonomic design of the mouth seal to push easily into the soft tissue of a user's face around the user's teeth, a substantially air-tight seal is created that does not hinder the user's ideal pronunciation and intonation of verbs adjectives, pronouns and other words easily without stress on the areas of the lips used for pronunciation. In a preferred embodiment, air from the user's breath during speech is directed through the anechoic channel for improved acoustic absorption and microphone sound pick-up. The result is voice communication being contained within the anechoic chamber of the device for maintaining privacy of the phone conversation.

Further disclosed, in general, are devices that provide a substantially active noise canceling area over a sound source by causing disruptive interference to all frequency fields of speech sounds from the sound source. In some embodiments, active noise control or active noise cancelation means ("ANC means") are provided to the device. Said means include one or more active noise canceling speakers for the addition of sound specifically designed to cancel noise from the speech sound source. In general, the devices feature: ANC means that are configured to destructively interfere with a sound source by the addition of an antiphasesound in an area around the sound source; a support arm for supporting the ANC means proximate to the sound source. Suitably, the ANC means are adapted to destructively interfere with sound energy generated by the sound source (e.g., human voice), and substantially cancel the sound energy. The amount of sound energy can be reduced via the presence of an ANC means (like an antiphase/antinoise speaker) for reducing the sound energy. In one configuration, the apparatus features an ear sealed chamber coupled to the support arm and positioned over a user's ear to keep ambient sounds out of a user's ear.

The disclosed devices may provide a substantially active noise canceling area over a sound source by causing disruptive interference to all megahertz frequency fields of communicative sounds by male and female speakers. In one embodiment, the device is defined by: a plurality of ANC means antiphase/anti-noise speakers) disposed about a receiver portion of a communication device; a support arm for the ANC means and receiver portion; and an ear chamber with an ear opening dampening acoustics about a microphone of a communication device. In a preferred embodiment, the device features electronics software on a printed circuit board (PCB), which measures the sound of a user's voice via a microphone and creates an antiphase noise to cancel the sound of the user's voice in substantially real-time (the best as the software can interpret the speech sounds and create antiphase sound waves). In a preferred embodiment, the ear and mouthpiece are configured for placement so that the device lies along the mentocervical angle, mentocervical angle length, mentonsubnasale length, bitragoin-subnasale arc, or bitragoin-menton arc of a user at a range of nineteen 5 to twenty three degrees. Other embodiments may not incorporate these angles. In use, a mouth may be placed adjacent to the ANC means and receiver portion to position the components in front of the mouth so that the acoustics of a communicative sound from the mouth are directed toward the receiver portion of the communication device. In a preferred embodiment, air from the user's breath during speech is directed through anti-phase noise created by the ANC means after interaction with the receiver portion of the device for improved acoustic absorption and microphone sound pick-up. The result is voice communication being noise canceled after pickup by the receiver for maintaining privacy of the phone conversation.

FIG. 12 is also an illustration of the operations of the device 1000. As shown, ANC means 1270 are provided to the device 1000 around the mouthpiece 1200. Said means 1270 include a sound source for the addition of sound specifically designed to cancel noise outside of the anechoic chamber. Preferably, the ANC means 1270 reduces unwanted sound by the addition of antiphase sound around the mouth of a user. Suitably, the mouth piece 1200 is adapted to detect air containing sound energy generated by the sound source (e.g., human voice), and distribute the antiphase sounds to destructively interfere or otherwise cancel the sound energy. In a preferred embodiment, the device features electronics software on a printed circuit board (PCB) which measures the sound of a user's voice via a microphone and creates an antiphase noise to cancel the sound of the user's voice in substantially real-time (the best as the software can interpret the speech sounds and create antiphase sound waves). In a preferred embodiment, the ear and mouth pieces are configured for placement so that the device lies along the mentocervical angle, mentocervical angle length, menton-subnasale length, bitragoin-subnasale arc, or bitragoin-menton arc of a user at a range of nineteen to twenty three degrees.

Figure 14:
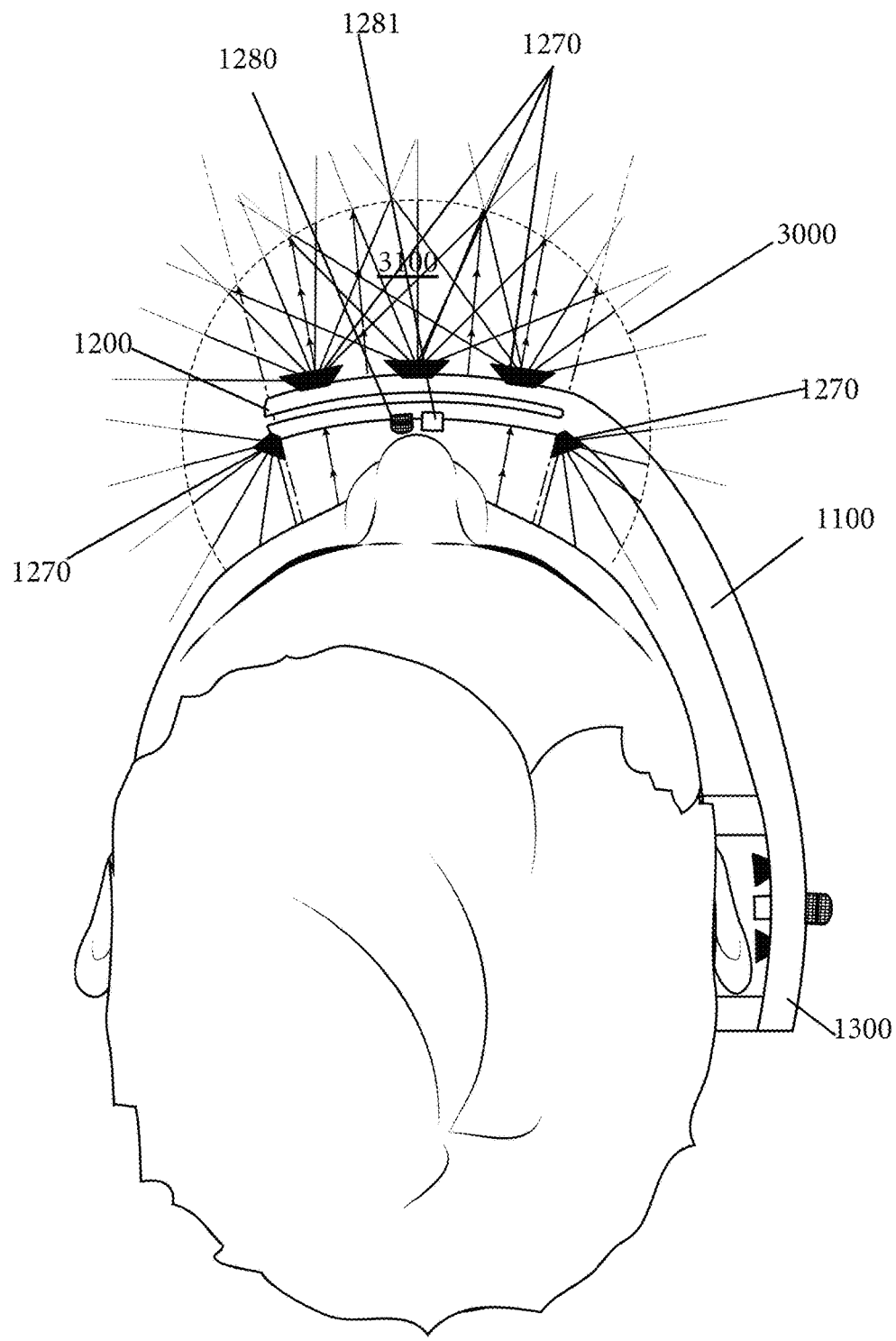
FIG. 14 is a top view of a headset.
Figure 15:
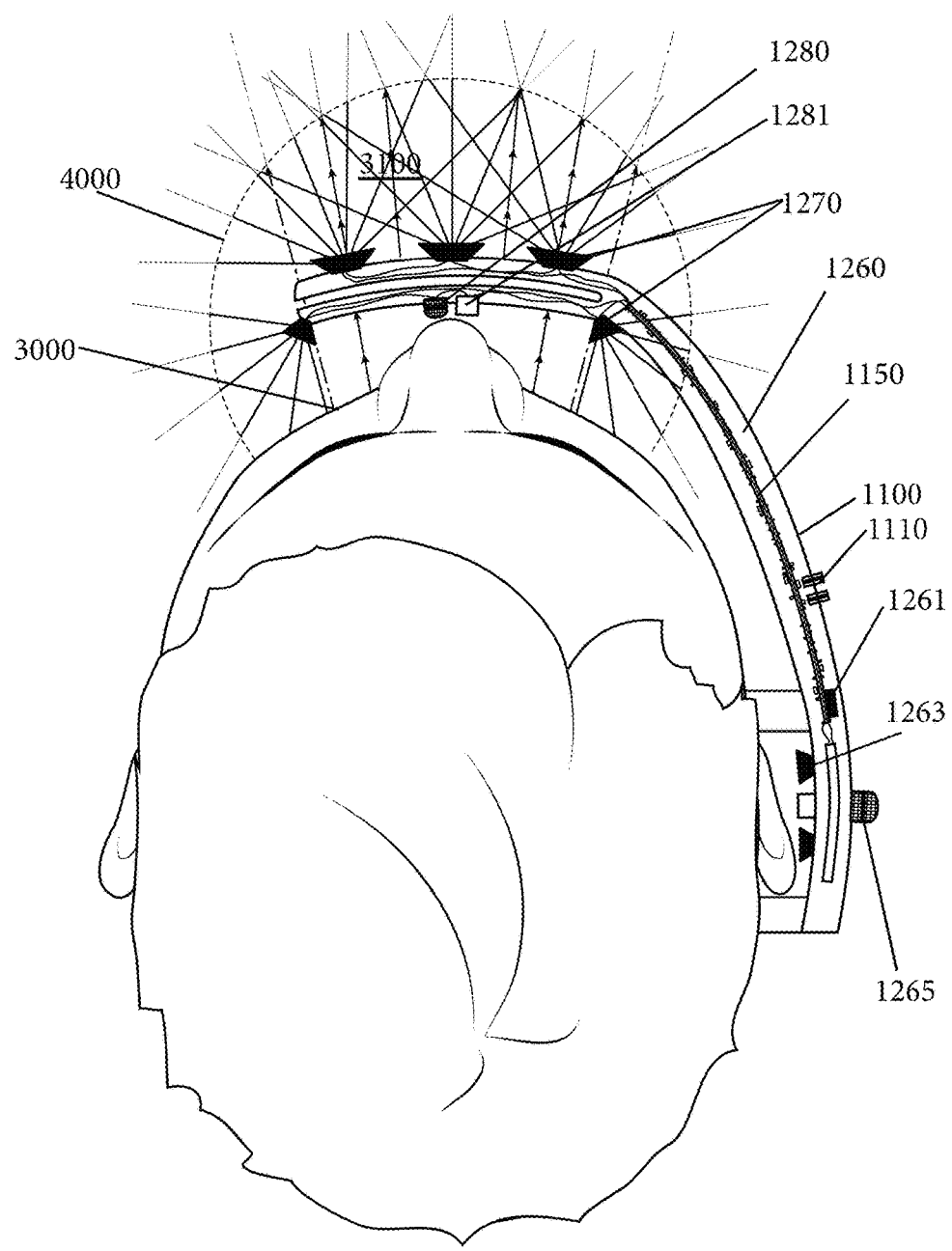
FIG. 15 is a top cross-section view of a headset.

FIG. 13 is a front and environmental view of another embodiment of a device 1000. FIG. 14 is a top and environmental view of the device 1000. FIG. 15 is a cross-section of the device 1000. As shown, the device 1000 of FIGS. 13 through 15 features active noise control or an active noise cancelation mouthpiece 1200, a support arm 1100, and an ear piece 1300. Suitably, the mouth piece 1200 features at least one ("ANC means") 1270 on its periphery and a microphone 1280 plus receiver 1281 directed toward a user's mouth (See FIG. 32). Said ANC means 1270 includes a sound source (like an antiphase/anti-noise speaker) for the addition of sound specifically designed 5 to cancel noise presented toward the receiver 1280. In operation, the mouthpiece picks-up voice sounds from the user via the microphone 1280 plus receiver 1281 and projects an active noise canceling area 4000 (show in broken lines) around the user's mouth 3000 via projecting antiphase noise (shown as crisscrossing lines 3100) in all 10 directions from the ANC means 1270 to destructively interfere with any voice sounds produced from the user's mouth. In this manner, the antiphase sound waves operate as a soundwave "wall" in the area around the mouth and in a matching volume level to cancel sound energy from the sound source (i.e., the human voice). Suitably, once the anti-noise/anti phase speaker sound waves hit the user's face, the residual sound, not noise canceled, becomes absorbed by the user's face with the reverberant energy reflecting off at a highly diminished decibel level.

FIG. 15 is a cross section of the device of FIG. 14. FIG. 15 shows the internal placement of the ANC means 1270 and other components within the device 1000. The support arm 1100 features a housing 1260 for retaining the electronics that enable the apparatus to be used in the manner of a telephone headset. As shown, the ANC means is electrically coupled to the printed circuit board 1150 of the device 1000 that is positioned within the support arm 1100 of the device. The positioning of the electronics in the arm 1100 is convenient to direct and expel the electronic heat from the device. As shown, the arm 1100 retains a battery 1161, a mother circuit board 1150 that is electrically coupled to the phone controls 1110 (including volume controls, on/off controls, and hold microphone button controls), a speaker 1263, an ambient sensing microphone 1265, a microphone 1280 that is specifically designed to function in a positive air pressure environment, and a receiver/transmitter 1281 (e.g., Bluetooth®) (which may be coupled to the mother circuit board 1150 for receiving and transmitting communications to and from a device (e.g., cell phone, two way radio, or home phone). These phone electronics are configured to operate in the manner of a Bluetooth® or other wireless headset for mobile, home, or office communication devices. In such configurations the blue tooth components will either be off or not located in the device. The microphone 1280 is also positioned so air from the intake will not cause "noise" air flow interference from incoming air when the user breathes. Suitably, the microphone 1280 is specifically designed to function in a positive air pressure environment.

Yet another embodiment of this disclosure may be a telephone headset that features an antiphase/anti-noise speaker within an anechoic chamber so that noises provided therein can be combatted with antiphase noises. In some embodiment, the antiphase/anti-noise speaker can be a DSP. In some embodiments, the headset is designed to include passive and active noise cancelation of a use's voice. Suitably, the headset can be adjusted to fit an inclusive range of head dimensions comfortably, the headsets may connect wirelessly to the user's phone to ensure cable free operation and communication.

Figure 16:
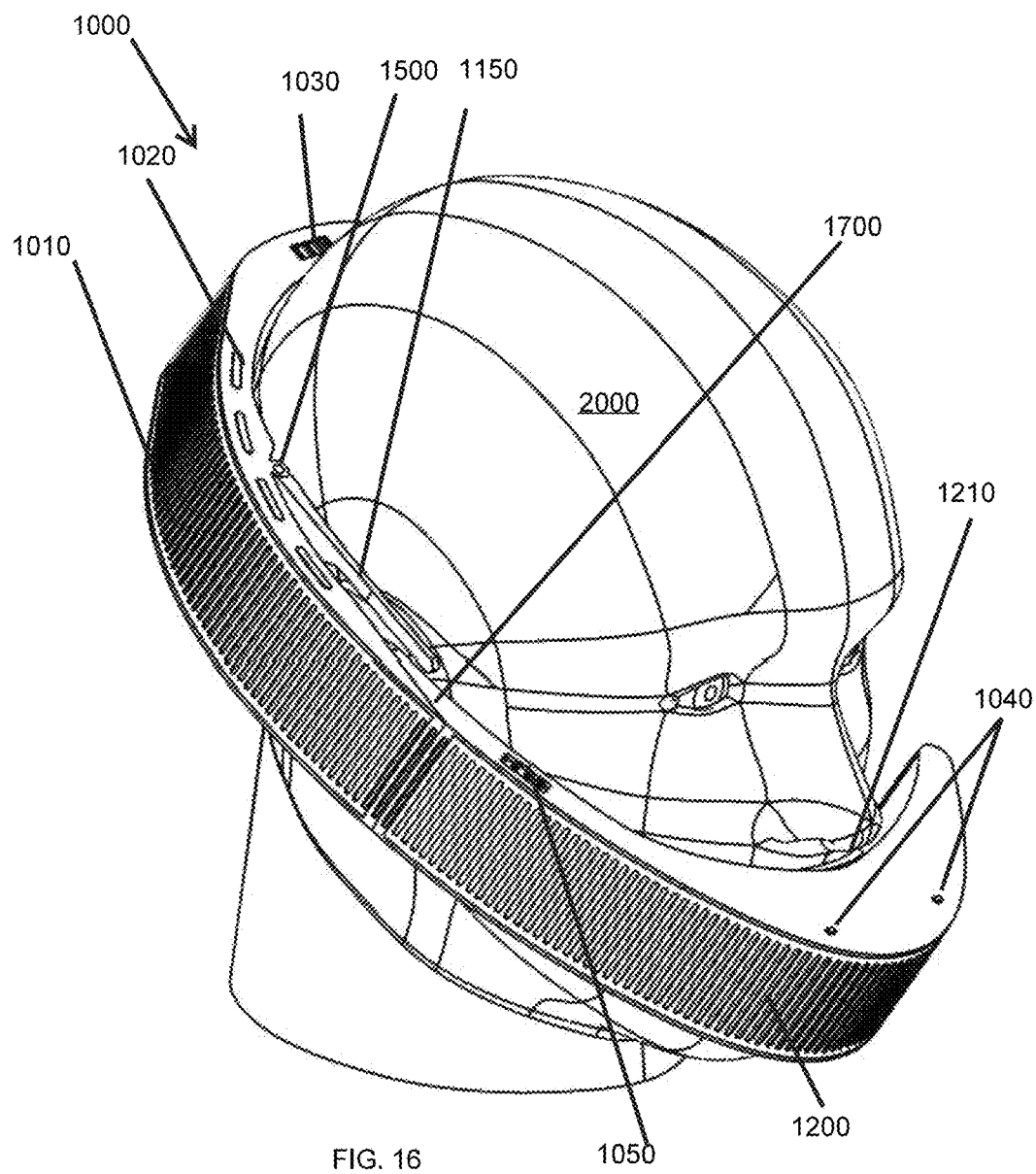
FIG. 16 is an isometric, left view of a headset 1000 on a human head 2000.
Figure 17:
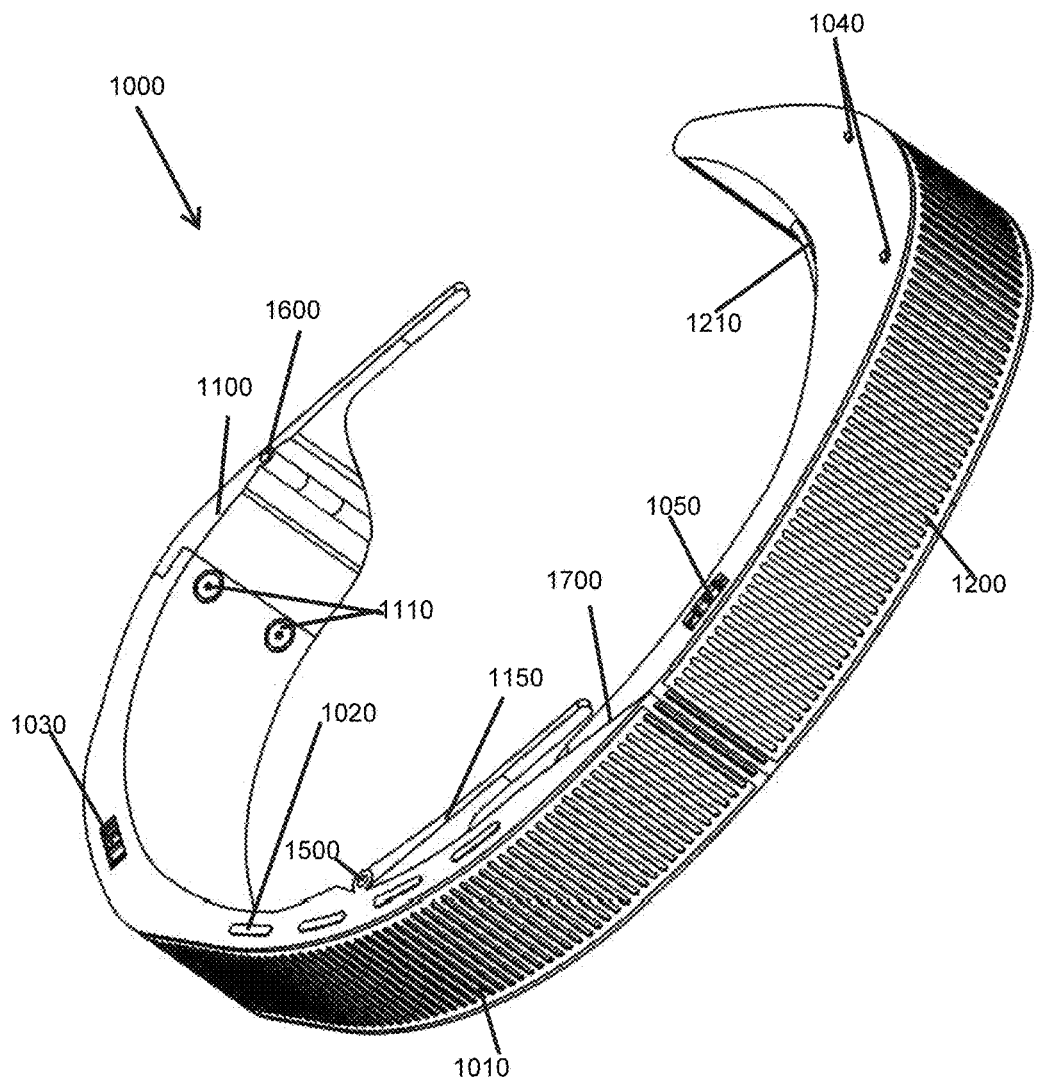
FIG. 17 is an isometric, left view of the headset 1000 of FIG. 16.
Figure 18:
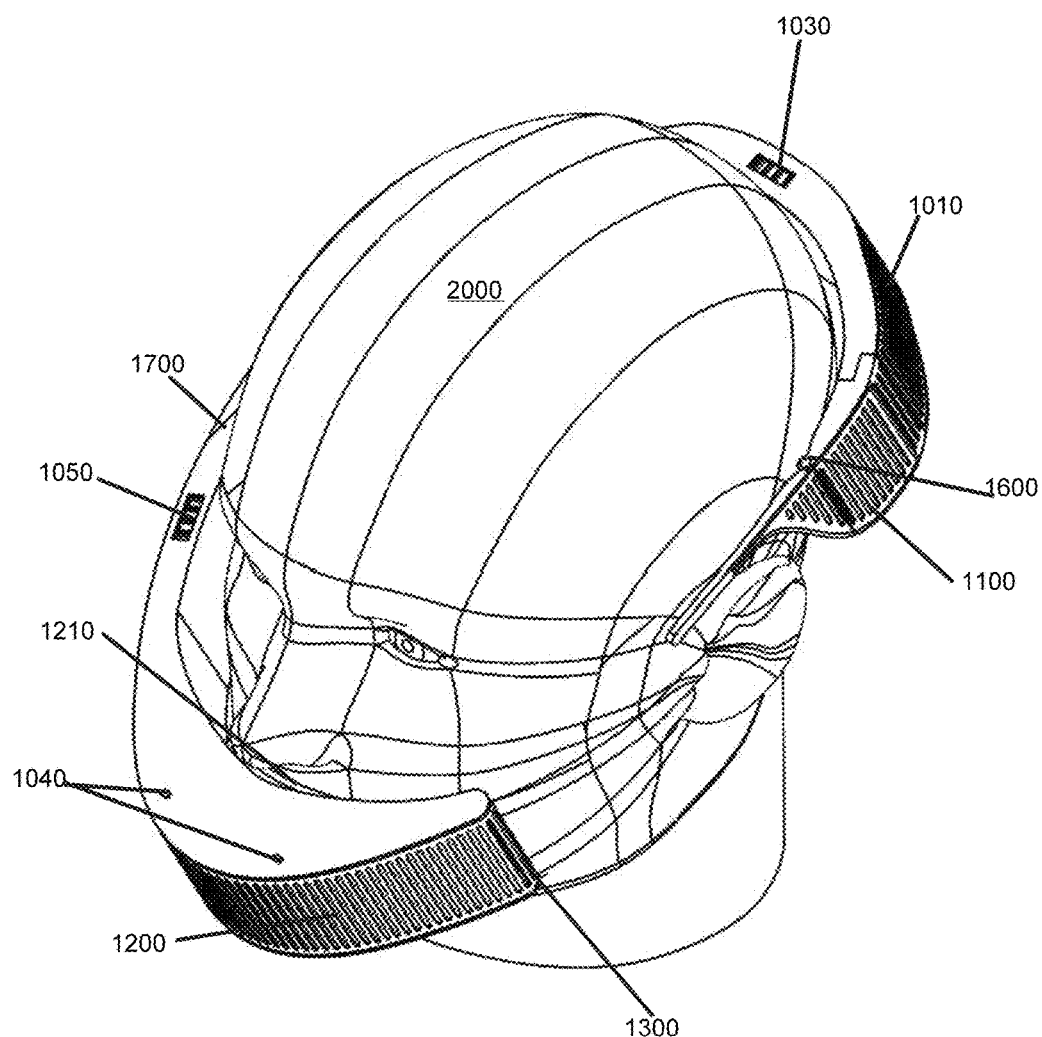
FIG. 18 is an isometric, right view of the headset 1000 of FIGS. 16 and 17 on the human head 2000 of FIG. 16.
Figure 19:
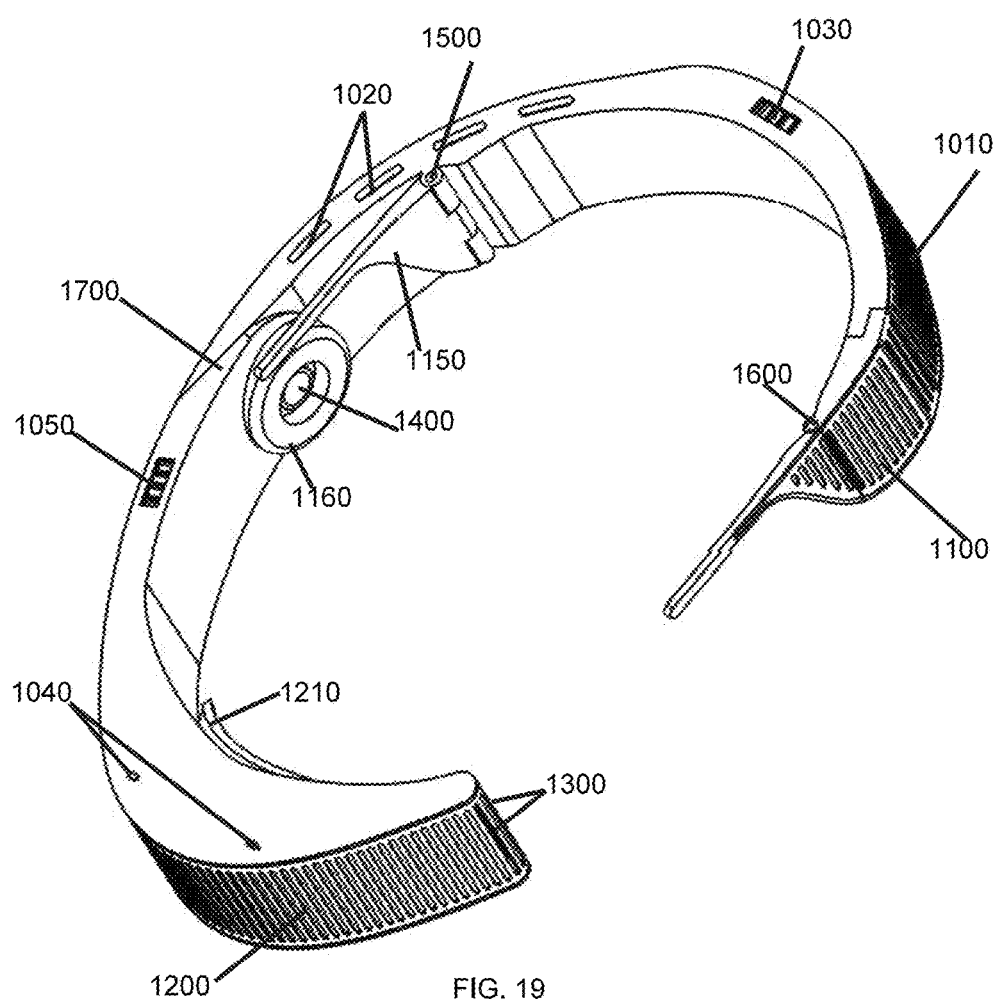
FIG. 19 is an isometric, right view of the headset 1000 of FIGS. 16 through 18.
Figure 20:
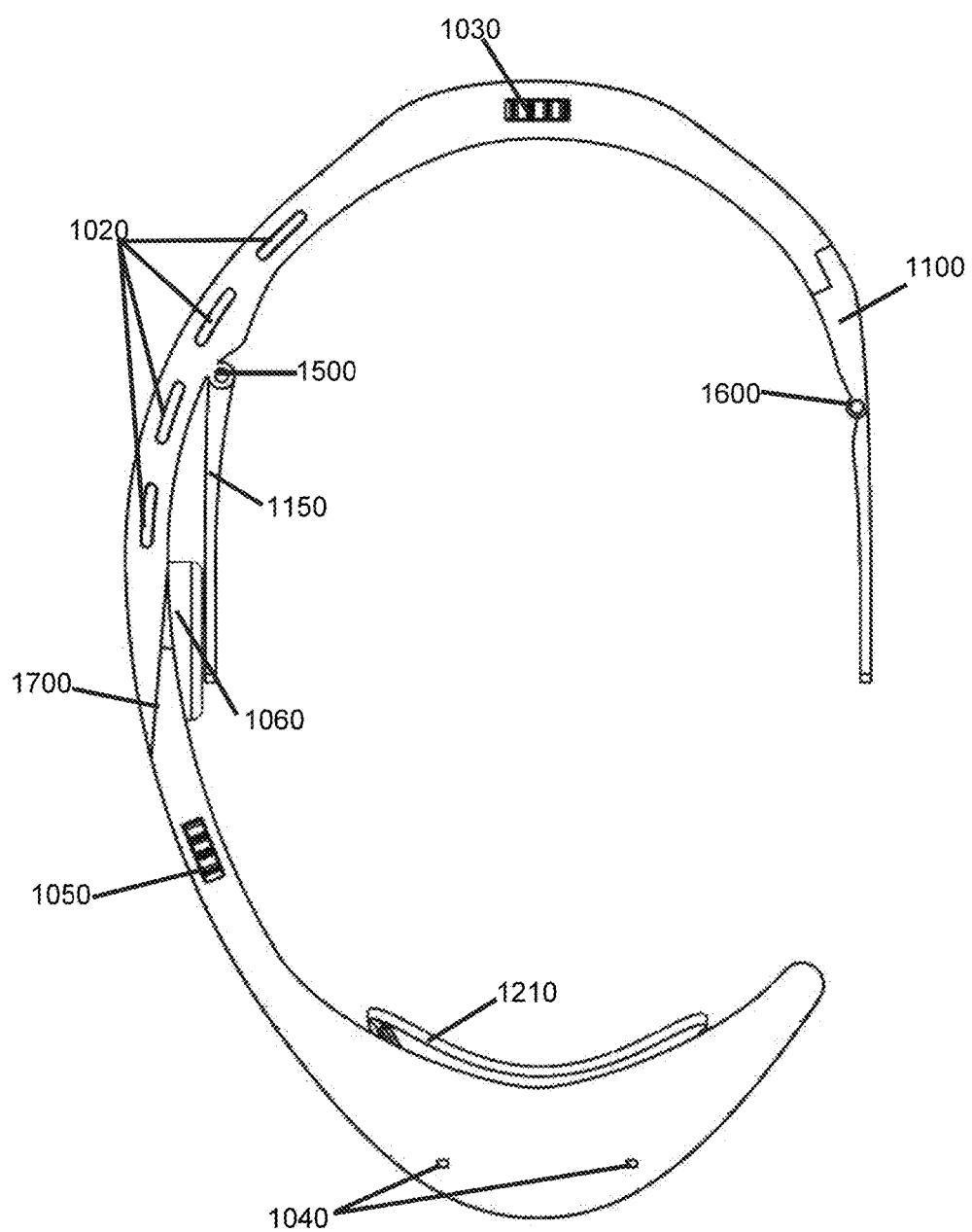
FIG. 20 is a top view of the headset 1000 of FIGS. 16 through 19.
Figure 21:
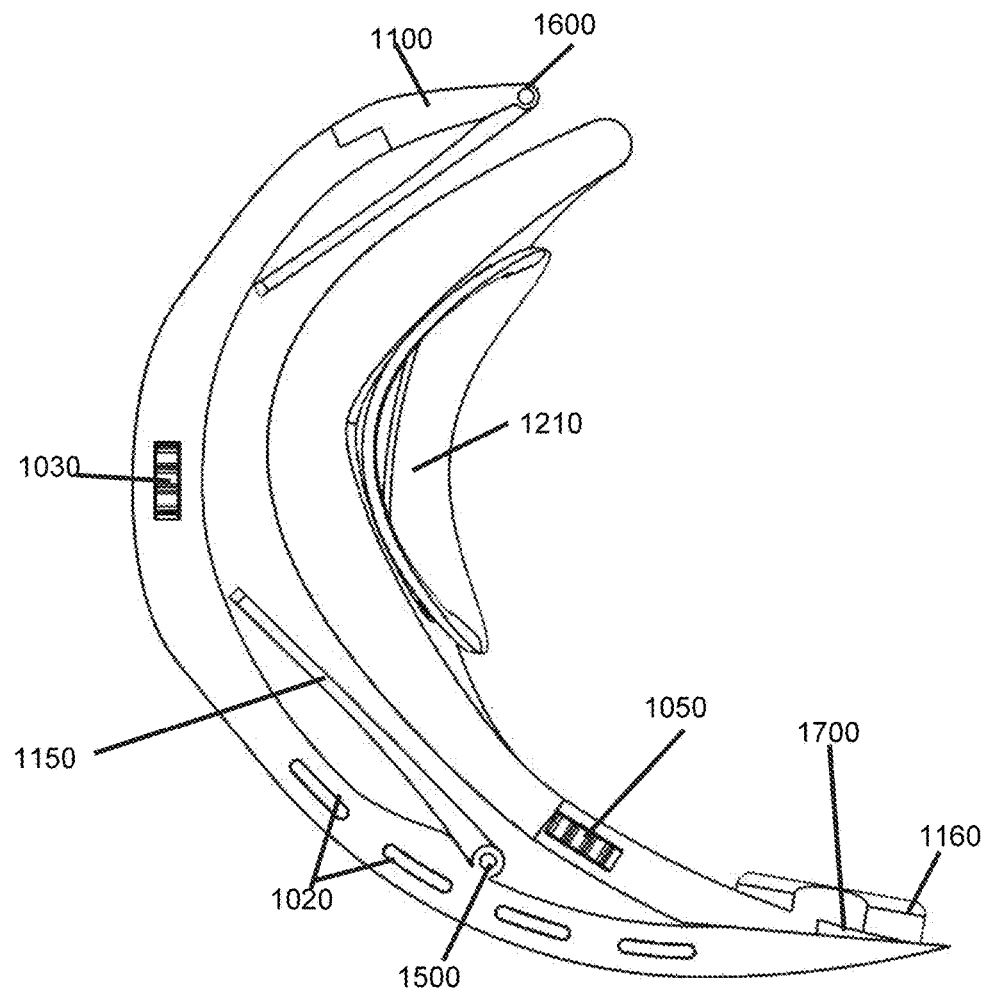
FIG. 21 is a top view of the headset 1000 of FIGS. 16 through 20 in a folded configuration.

FIG. 16 is an isometric, left view of a headset 1000 on a human head 2000. FIG. 17 is an isometric, left view of the headset 1000 of FIG. 16. FIG. 18 is an isometric, right view of the headset 1000 of FIGS. 16 and 17 on the human head 2000 of FIG. 16. FIG. 19 is an isometric, right view of the headset 1000 of FIGS. 16 through 18. FIG. 20 is a top view of the headset 1000 of FIGS. 16 through 19. As shown, the headset 1000 externally comprises:
a rear cover 1010;
selection buttons 1020;
rear adjustment dial 1030;
notification LEDs 1040;
a mouth section adjustment dial 1050;
a switchable ear mount 1100;
switchable ear mount replacement screws 1110;
an inside ear hanger 1150;
an ear cushion 1160;
a mouth section cover 1200;
a mouth seal ring 1210;
a Helmholtz vent 1300;
a speaker 1400;
a right hinge 1500;
a left hinge 1600; and,
a headset hinge 1700.

As shown in FIGS. 16 through 20, the headset 1000 may be worn on the head of a wearer so that the mouth seal ring 1210 is positioned over a user's 2000 mouth while the ear cushion 1160 and speaker 1400 are positioned against the user's 2000 ear. In one embodiment, the ear cushion 1160 provides a comfortable seal around the user's 2000 ear during use. The ear cushion 1160 also dampens ambient noise. The mouth seal ring 1210 suitably is configured to make contact with the user's face 100 at an angle perpendicular to the mouth opening while sealing comfortably to soft tissue around the mouth while the user is talking. In one embodiment, the seal around the mouth by the mouth piece 1210 is similar to the seal of a scuba diver's facemask around the eyes of a wearer. As discussed in detail below, the mouthpiece 1210 may move toward or away from the user's mouth by the adjustment dial 1050. The headset features a shell for enclosing electrical components. Suitably, the shell is defined by a rear cover 1010 and a mouth section cover.

Suitably, the headset 1000 may be positioned over the ears of a wearer 2000 by ear hangers 1150. Suitably, ear hangers are reversible so that the ear cushion 1160 and speaker 1400 may be positioned over the left or right ears of a wearer 2000. As shown, the headset 1000 is over the right ear of a wearer 2000 but the same could be worn over the right ear by (a) swapping out the switchable ear mount 1100 by removing the screws 1110 and flipping the wear mount 1100 relative to the headset 100; and (b) flipping the inside ear hanger 1150 relative to the headset 1000. In a preferred embodiment, the left and right ear hangers 1150 are sized to fit comfortably behind the ear of a wearer 2000. Suitably, the ear hangers 1150 support the mass of the headset 1000 on the wearer's 2000 ears as well as applying pressure to the sides of the wearer's 2000 head. The mouth section of the device 1000 suitably features a Helmholtz vent 1300 defined by slot in the cover where exhaust gasses and sound pressure may exit the device. Suitably, the vent 1300 may contribute to the overall aesthetics of the headset 1000.

Still referring to FIGS. 16 through 20, the headset 1000 may be worn on the head of a user 2000. In a preferred embodiment, the ear cushion 1160 and mouth pieces 1210 are configured for placement so that the device 1000 lies along the mentocervical angle, mentocervical angle length, menton-subnasale length, bitragoin-subnasale arc, or bitragoin-menton arc of a user at a range of nineteen to twenty three degrees. To assist in proper sizing, the rear adjustment dial 1030 may be turned to adjust the width of the device as measured between the two ear hangers 1150. Suitably, the rear adjustment dial 1030 adjusts the left to right width of the headset 1000 as well as the level of pressure exerted by the headset 1000 on a user's head 2000. Suitably, the movement of the headset 1000 relative to the head 2000 may be minimized during use of the headset 1000. To further assist in proper sizing the depth of the device measured from mouth piece 1210 to the back of the device 1000 may be adjusted by the mouth section adjustment dial 1050. Suitably, the mouth adjustment dial 1050 adjusts the font to back length of the headset 1000 as well as the distance from and level of pressure exerted by the mouthpiece 1210 on the user's face 2000. The adjustment wheel and other dials 1030/1050 may suitably be accessible through the bottom and top of the headset so that it can be gripped on both sides during use. In a preferred embodiment the dial 1030/1050 has deep ridges around the radius to ensure tactical feedback for ease of use while the headset is on the user's head because the dial 1030/1050 is out of view. Suitably, the adjustment dials 1030/1050 are designed to allow the headset 1000 to be adjusted to fit a range from a first percentile female head to a 99 percentile male head based on available anthropometric data.

In a preferred embodiment, the headset 1000 does not go over the head 2000 like traditional headphones in order to avoid the influence that flexing of the temples during speech may have on the function of the mouth seal 1210 and quality of sound cancelation. Suitably, the dials 1030/1050 may expand and contract the rear and side sections of the headset.

FIG. 18 is a top view of the headset 1000 of FIGS. 16 through 20 in a folded configuration. Suitably, the headset 1000 may be considered collapsible wherein the device 1000 may be folded on itself around the headset hinge 1700. Suitably, the speaker 1400 is provided at the pivot point to allow for continuous use of the headset in a folded position. Suitably, the headset hinge 1700 allows the headset to fold in half for compact storage. The hinge 1700 further enables the user 2000 to rotate the front of the headset 1000 over their head 2000 and out of the way of their mouth when the mouthpiece 1210 is not in use. Suitably, the hinge 1700 pivots around the speaker 1400 and ear cushion 1160 to ensure that the speaker 1400 and ear cushion 1160 remain in a correct position while the headset 1000 is in a folded configuration. The headset 1000 hinge 1700 is able to stop incrementally throughout its 180 degree rotational range of motion. Suitably, the stop increments can include, but should not be limited to, 90 degrees for comfortable positioning of the mouthpiece 1210 over the user's 2000 head when the mouthpiece 1210 is not in use as well as at 180 degrees for storage. To further assist in the collapsibility of the headset 1000, the ear hangers 1150 are provided with hinges 1500, 1600 so that the hangers 1150 may be folded to minimize headset 1000 size during storage. The left hinge 1500 suitably enables the hangers 1150 to fold backward to minimize size during storage. In a preferred embodiment, the left hinge 1500 range of motion does not enable the left ear hanger 1150 to contact the headset 100 while it is in the folded position and stops in the extended position when the left ear hanger 1150 is in line with the user's head 2000. The right hinge 1600 also may suitably fold backward relative to the headset 1000. The right hinge 1600 range of motion does not allow the right ear hanger 1150 to contact the headset 1000 when in its folded position and stops in the extended position whenever the right ear hanger 1150 is in line with the user's head 2000.

Figure 22:
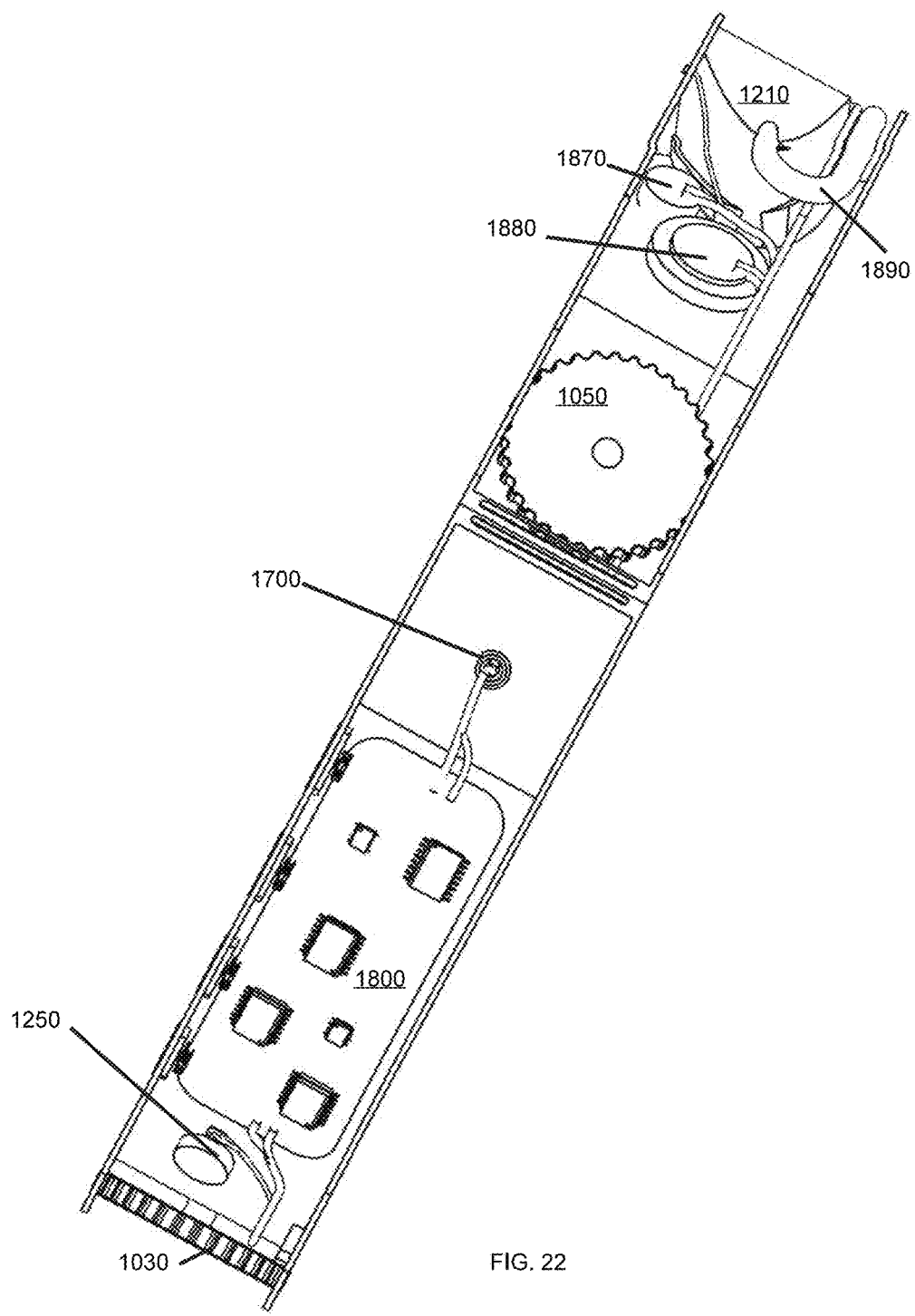
FIG. 22 is an internal right-side view of the headset 1000 of FIGS. 16 through 21.
Figure 23A:
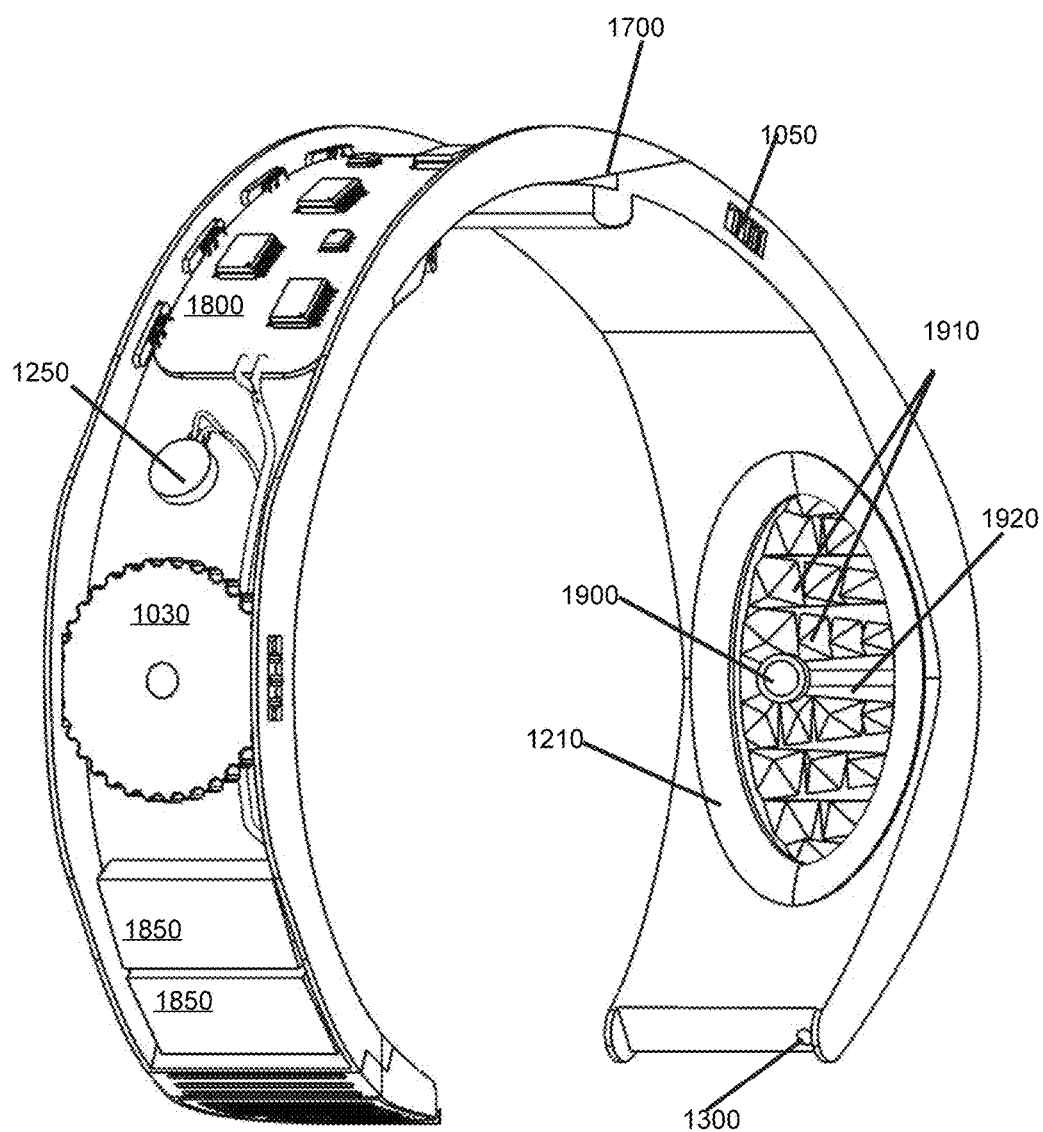
FIG. 23A is an internal backside view of the headset 1000 of FIGS. 16 through 22.
Figure 23B:
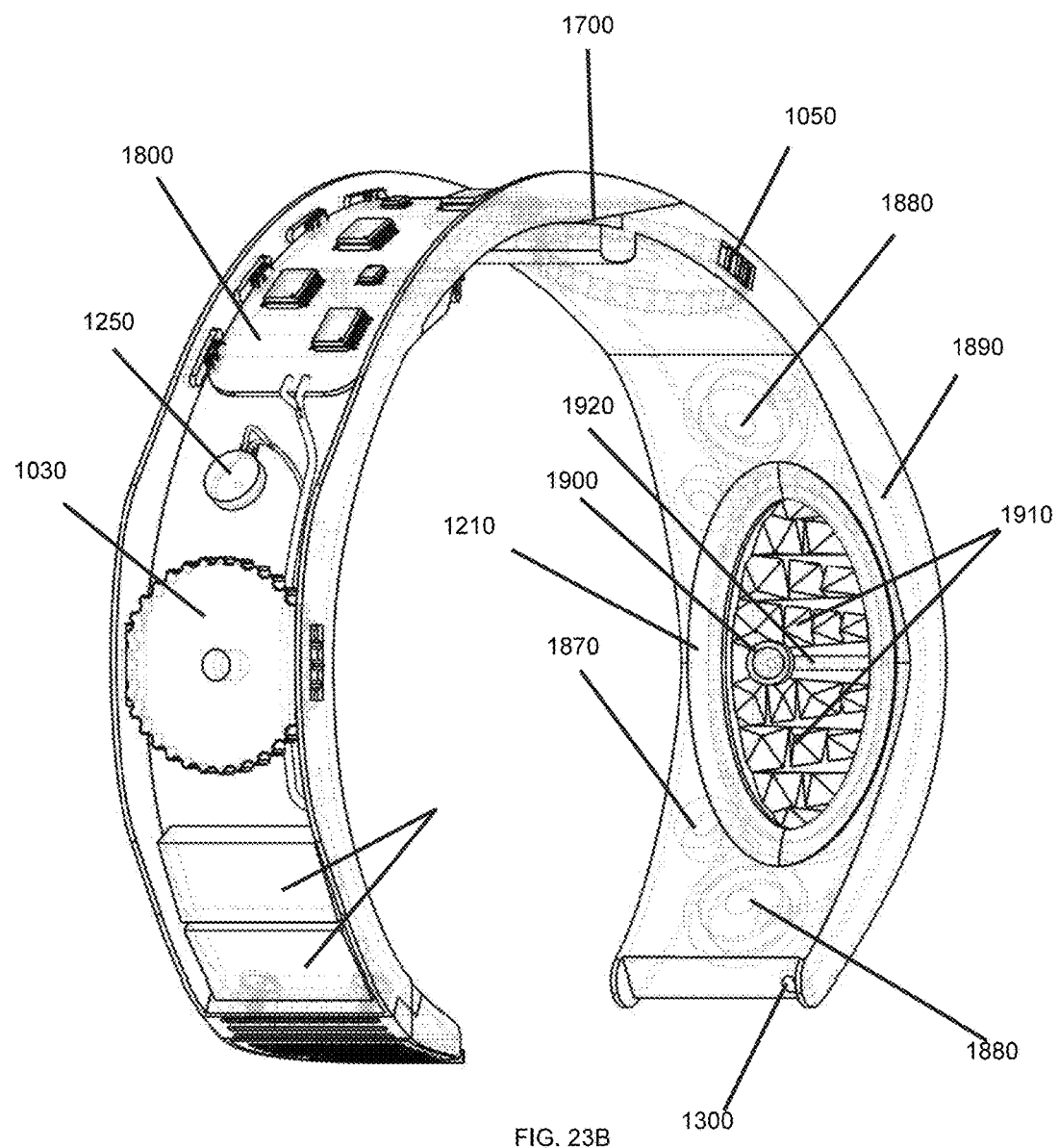
FIG. 23B is a see-through internal backside view of the headset 1000 of FIGS. 16 through 22.
Figure 24:
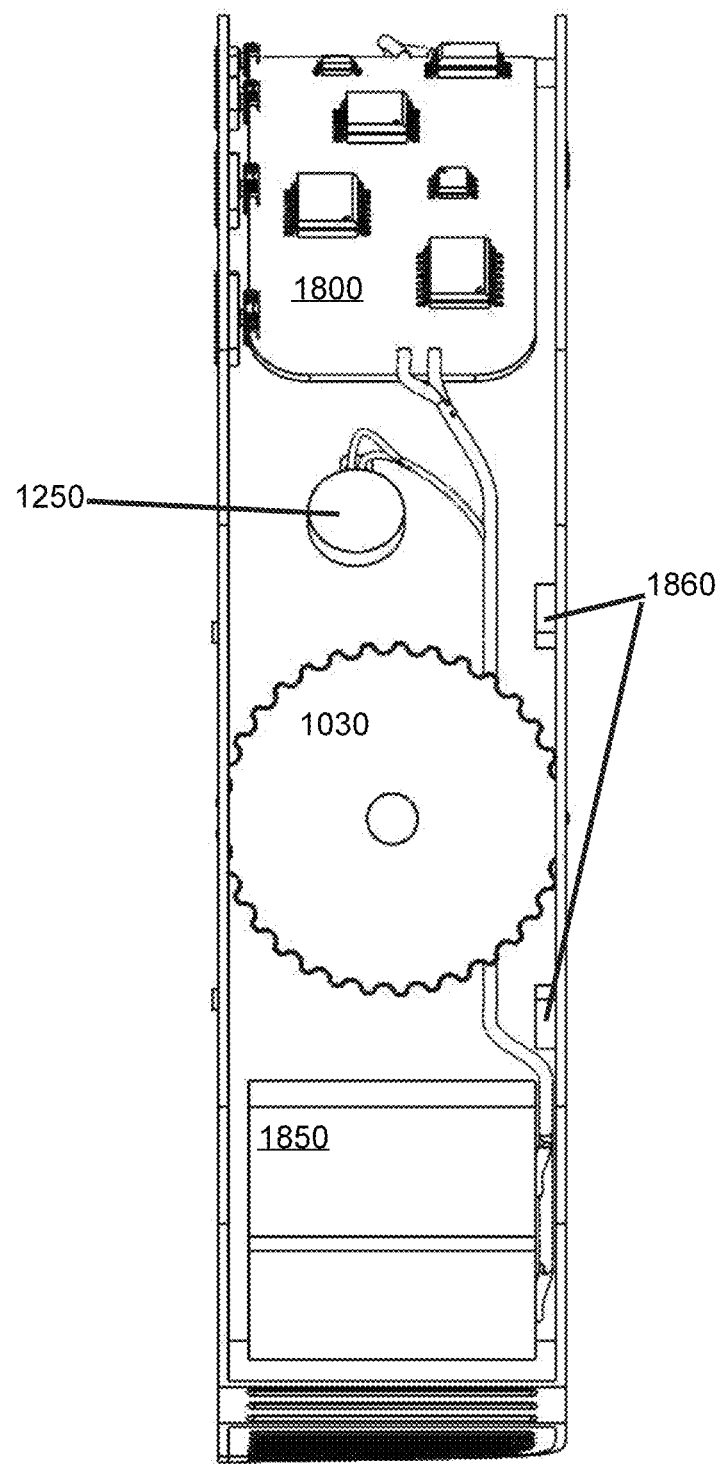
FIG. 24 is an internal back view of the headset 1000 of FIGS. 16 through 23B.
Figure 25:
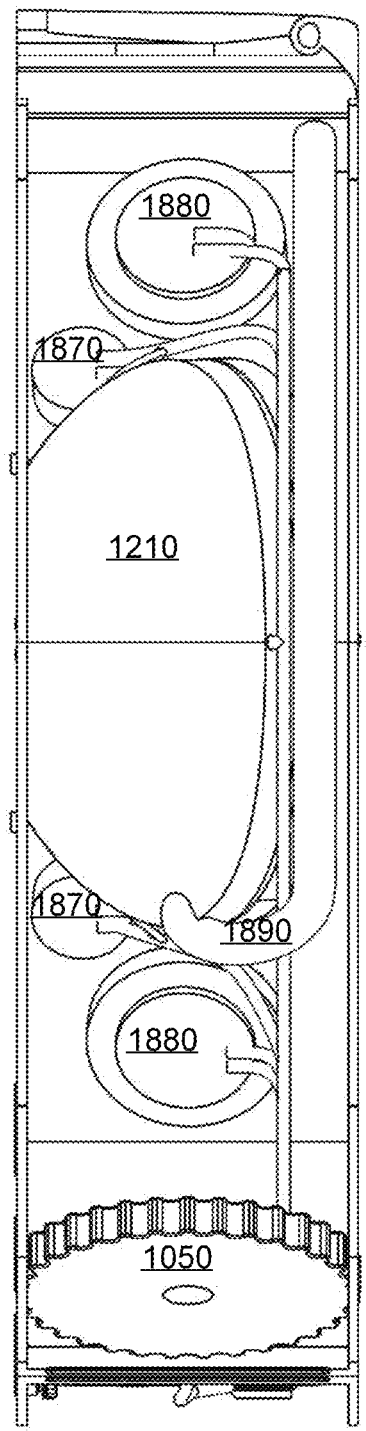
FIG. 25 is an internal front view of the headset 1000 of FIGS. 16 through 24; and, FIG. 26 is a cross-section of a mouth portion of the headset 1000 Of FIGS. 16 through 26.

FIG. 22 is an internal right-side view of the headset 1000 of FIGS. 16 through 21 with the mouth cover 1200 and rear cover 1010 removed. FIG. 23A is an internal backside view of the headset 1000 of FIGS. 16 through 21 with the mouth cover 1200 and rear cover 1010 removed. FIG. 23B is a see-through internal backside view of the headset 1000 of FIGS. 16 through 21 with the mouth cover 1200 and rear cover 1010 removed. FIG. 24 is an internal back view of the headset 1000 of FIGS. 16 through 21 with the mouth cover 1200 and rear cover 1010 removed. FIG. 25 is an internal front view of the headset 1000 of FIGS. 16 through 21 with the mouth cover 1200 and rear cover 1010 removed. As shown, the device internally comprises:
the hinge 1700 with a wire through-hole;
a circuit board 1800;
the side adjustment wheel 1050;
the rear adjustment wheel 1030;
a vibration motor 1800;
batteries 1850;
weights 1860;
small exciters 1870;
large exciters 1880; Helmholtz resonator 1890;
a microphone 1900; and,
acoustic dampeners 1910.

Referring to FIGS. 22 through 25, the headset 1000 features a circuit board 1800. Suitably, the circuit board is curved to mature the curvature of the headset 1000. In one embodiment, the circuit board 1800 contains all the processing and control operation of the headset. Specifically, the circuit board controls the vibration motor 1250, the small exciters 1870, the large exciters 1880, and the light 1400, the microphone 1900 and speaker 1400. Suitably, the control buttons 1210 (FIGS. 16-21) may be used to control call functionality and settings, including call and phone controls. The LED lights 1400 may suitably be used to notify the user when the headset 1000 is worn, including indications of phone actives such as incoming calls, Bluetooth connection etc. The vibration motor 1250 may suitably be used to provide sensory feedback for varying phone functions including but not limited to incoming calls or call waiting. The small exciters 1870 may suitably be used to produce white and pink noise to aid in active noise canceling or masking of a user's voice and should be included in ANC means. The large exciters 1880 are intended for active noise cancellation of the user's voice including the cancelation of low frequency sound pressure. The microphone 1900 may be used to pick-up the voice during headset 1000 use. As shown, the microphone 1900 may be positioned at the front of the mouth and centered to incoming sounds from the mouth. As shown, a wire harness 1920 may be used to rout through the interior of the phone for energy and data transfer. In a preferred embodiment, the electronic components may be powered by batteries 1850. In one embodiment, the batteries 1850 are sized to ensure extended use of the headset without the need for charging or for power cables. In one embodiment the batteries 1850 are positioned at the back of the headset 1000 so that the weight of the batteries 1850 can assist in balancing the headset 1000. Other balancing weights 1860 may be positioned along the side of the headset 1000 for balanced weight distribution. Suitably, the hinge 1700 may suitably feature a hole there through so that wires may be provided between the speaker 1400 and circuit board 1800 without affecting the collapsibility of the headset 1000. Also, the hole through the hinge allows the electrical components to be connected to the batteries and circuit board 1800 while the headset 1000 is folded. Finally, the headset 1000 features a Helmholtz resonator 1890. Suitably, the Helmholtz resonator 1890 is designed to dampen sound pressure emitted by the users while talking. In a preferred embodiment, exhaled as is contained and passed through the tuned Helmholtz resonator 1890 for treatment before being exhausted out of the phone via the vents 1300.

Figure 26:
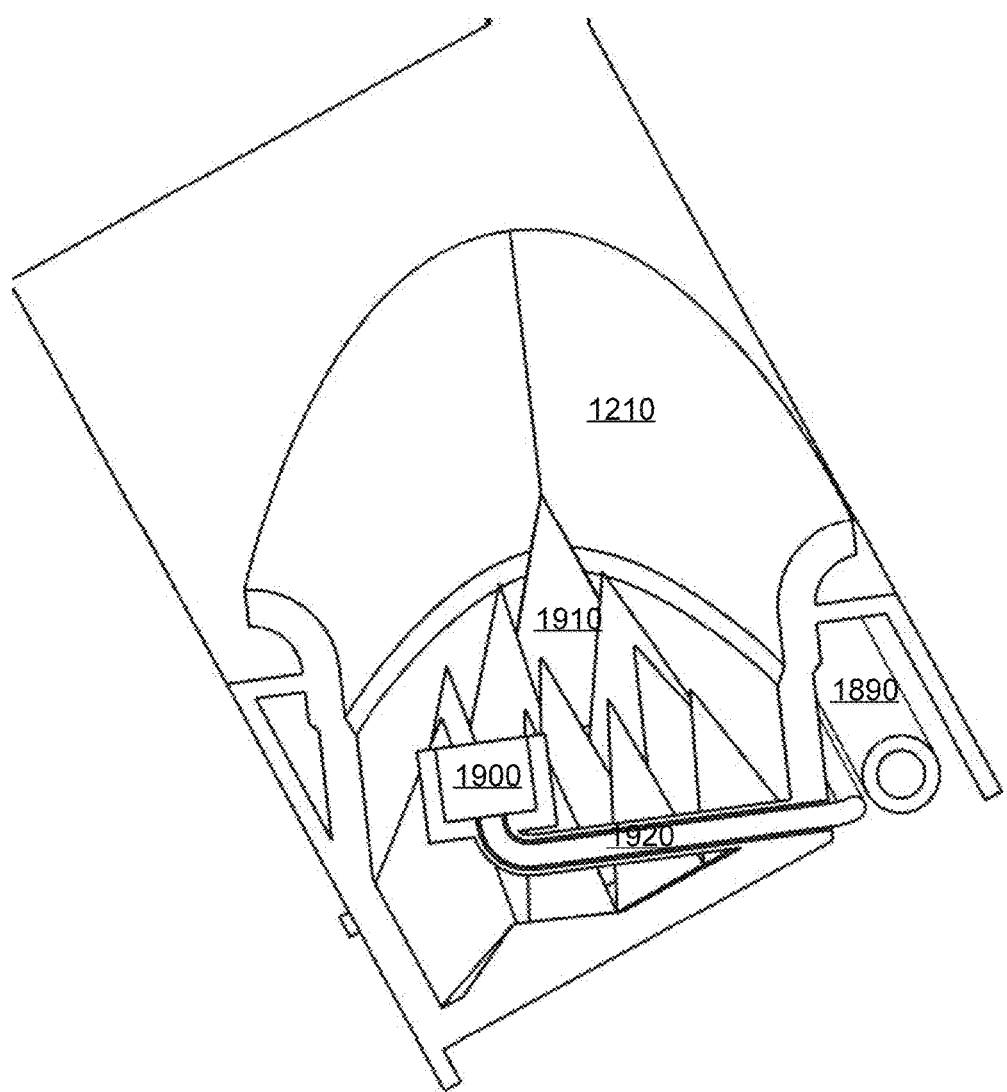

FIG. 26 is a cross-section of a mouth portion of the headset 1000 Of FIGS. 16 through 23. Suitably, the mouth portion of the headset 1000 features acoustic dampeners 1910. As shown, the dampeners 1910 are defined by triangles or pyramids of sound absorbing material. Suitably the dampeners 1910 are positioned in front of the user's mouth inside the sound collection chamber 1210 of the headset 1000. The dampeners 1910 are suitably part of the passive sound cancelation system to absorb mainly high frequency sound pressure. Suitably the chamber 1210 may be removable for sanitation purposes.

As stated above, FIG. 26 is a cross-section of a mouth portion of the headset 1000 of FIGS. 16 through 25 where the mouth portion of the headset 1000 (FIGS. 16-25) features acoustic dampeners 1910 (FIGS. 16-25). As shown, the dampeners 1910 (FIGS. 16-25) are defined by triangles or pyramids of sound absorbing material. Similarly, FIGS. 1 through 3 illustrate the sidewalls of the anechoic chamber 1100 (FIGS. 1-3) and anechoic channel 1250 (FIGS. 1-3) are configured to trap, contain, absorb, direct, and deflect sound energy from air that contacts its surface area. For this purpose, the sidewalls of the anechoic chamber 1100 (FIGS. 1-3) and channel 1250 (FIGS. 1-3), the sidewalls are also said to be defined by triangles or pyramids of sound absorbing material. Other embodiments of the devices in the document's patent family are similarly described. Earlier embodiments of the invention contemplated metallic layers. Now, In a preferred embodiment, the sound absorbing material used to construct any anechoic cup (e.g., the mouth portions with dampeners 1910 of FIG. 26) or anechoic chambers (e.g., the anechoic chamber 1100 of FIGS. 1-3) may suitably be constructed of metallic flake mixed into or with a sound attenuating or absorbing material like, for example, silicone. Mixing metallic flake with a sound a sound attenuating or absorbing material is dubbed "metalizing" the material so that the material is "metallized." Such materials can also be used to construct any secondary anechoic chambers or anechoic channels.

Suitably, it has been discovered by the Applicant that lowering durometer of materials (e.g., materials with a shore hardness scale of 00) used in any primary or secondary anechoic chambers of a communication devices increases sound wave absorption (register at 00-11) and reduces reverberant energy (reflected sound) passing to the communication device's microphone. The preferred embodiment involves metalizing the anechoic components so the microphone is enabled to pick up the "stereo" effect of voice being reflected of the cup or sidewalls, similar to open air microphone environments where a person's voice bounces off walls, ceilings, etc. for the ear to pick up the voice sound in stereo for a higher intelligibility of the voice sounds. So, in a preferred embodiment, materials used for constructing anechoic components (including dampeners and sidewalls) may be constructed of materials mixed with metallic flake (e.g., 5 micron particle size). In one embodiment, the material may be silicon mixed with metallic flake to create an anechoic component that is flexible and metalized. The components are flexible so that they can be removed from the device and placed sterilized or otherwise cleaned after use. Suitably, liquid silicone and metallic flake may be mixed and put in a mold or cast to construct the anechoic components. Preferably, the flake may be vulcanized to the silicone. A range of metallic flake size can be employed. For example metallic flake in the range of 1 to 10 microns can be used. However a flake of about 5 microns is preferable since larger flakes tend to sink to the bottom of a mold and smaller particles do not reflect enough light giving the anechoic components a dull appearance.

As discussed above, some embodiments of the disclosed technology include active noise control or active noise cancelation means, including exciters. Typically, said means include a sound source for the addition of sound specifically designed to cancel noise from the user's mouth. Some embodiments may include computer hardware and memory with voice-recognition software that is configured to receive a user's spoken voice during a test conversation, analyze the voice for its hertz spectrums evident in the test conversation, and subsequently employ the data during active noise cancelation. Suitably, this voice recognized noise cancelation or active noise cancelation via voice algorithm can be used to actively noise cancel a user's voice in a manner that is specifically tailored to the user by directing the sound source to provide an inverted signal that is 180 degrees out of phase with the user's actual voice. In one embodiment, the voice algorithm allows a digital CPU to anticipate the manner, (including tonality, rhythm, and cadence) of a user's speaking and predict an appropriately inverted signal so that noise is substantially canceled.

Figure 27A:
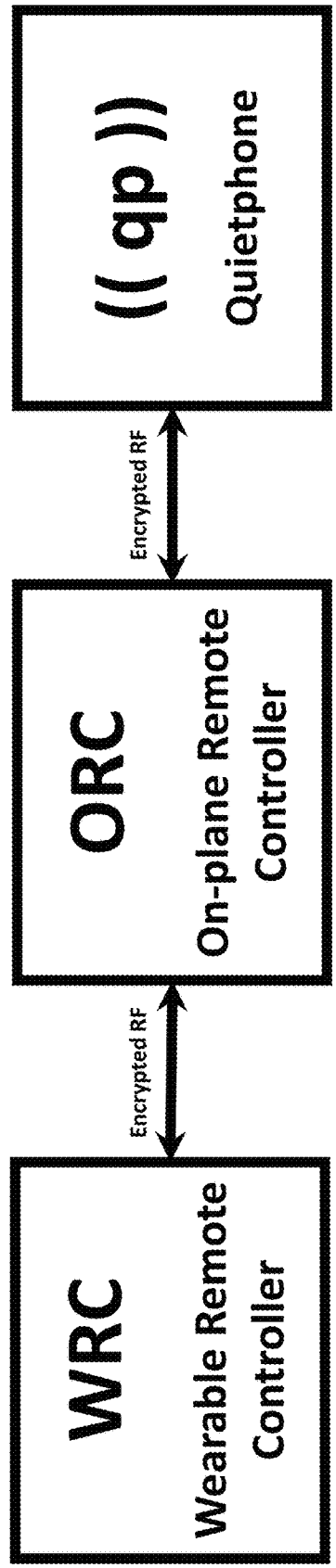
FIG. 27A is a block diagram for a system of enabling or disabling a communication device.

The disclosed technology contemplates use of a communication device in public without a user's voice being overheard by the public. In certain situations, public use of a communication device, even when the conversation is private, may not be appropriate. For example, during takeoff for an airplane or other mode of public transportation, communication devices may interfere with sensitive electronics of the airplane or other public use vehicle. So, a preferred embodiment of the disclosed technology involves a system of enabling or disabling a communication device. FIG. 27A is a block diagram for a system of enabling or disabling a communication device that includes the technology of this patent family called Quietphone™. As shown, airplane or other public transit vehicle may be outfitted with an on-plane remote controller (OCR) that is capable of disabling/disabling the electronics of the Quietphone™ via communication with the microcontroller of the Quietphone™. Suitably, the OCR may be electively controllable by a wearable remote controller (WRC) that is remote relative to the Quietphone™. Suitably, the WRC may be used to remotely enable or disable the Quietphone™ via the ORC. In a preferred embodiment, the WRC communicates with the ORC via encrypted RF to Bluetooth to enable/disable Quietphone™ for use on all "public transportation" methods not including but not limited to airplanes, trains, subways, bus, and the like.

Figure 27B:
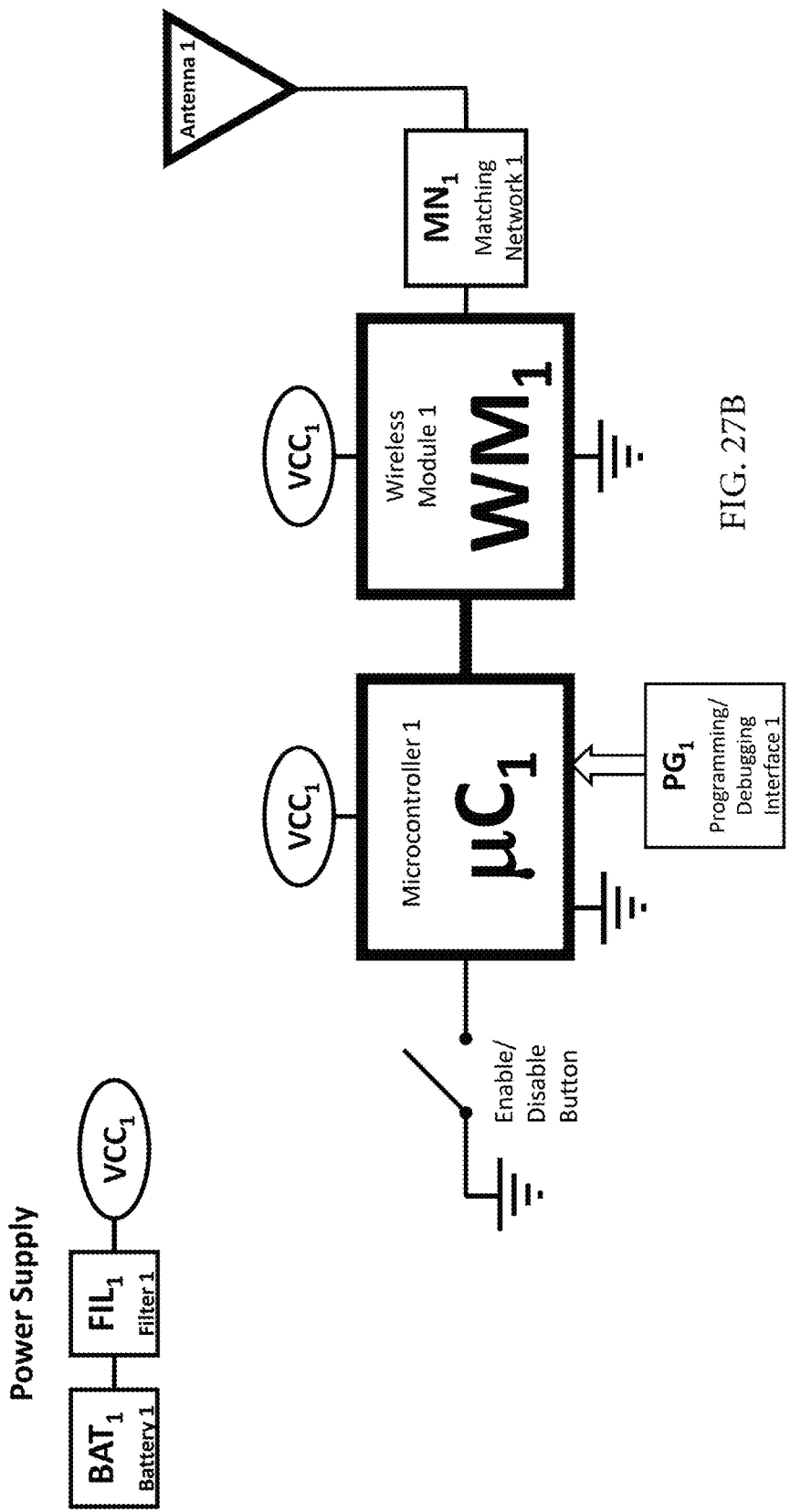
FIG. 27B is a schematic of the WRC.
Figure 27C:
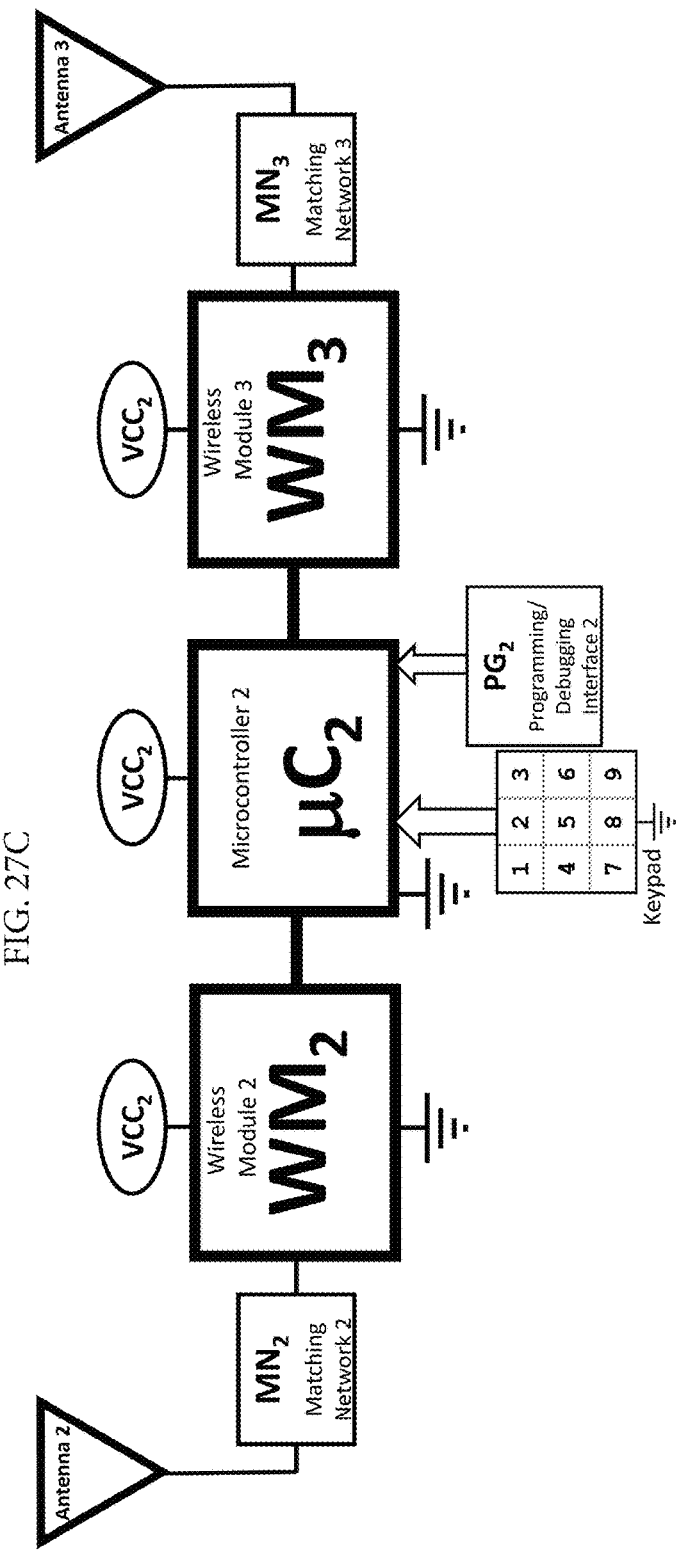
FIG. 27C is a schematic of the ORC.
Figure 27D:
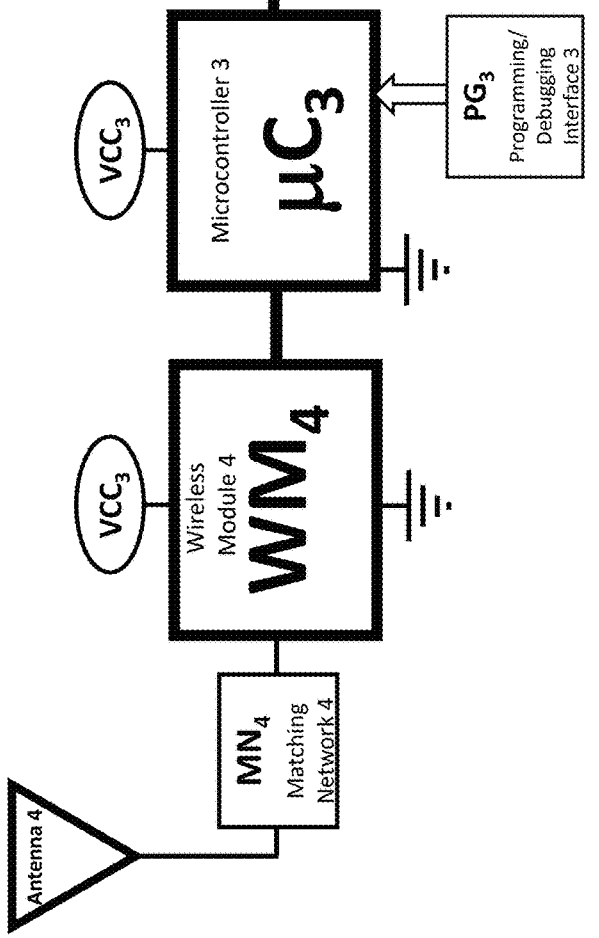
FIG. 27D is a schematic of the Quietphone™ as it pertains to disable/enable functionality; and, FIG. 28 is a diagram of an airplane passenger fuselage and an illustration of the disclosed enable/disable feature of a communication device.
Figure 27D:
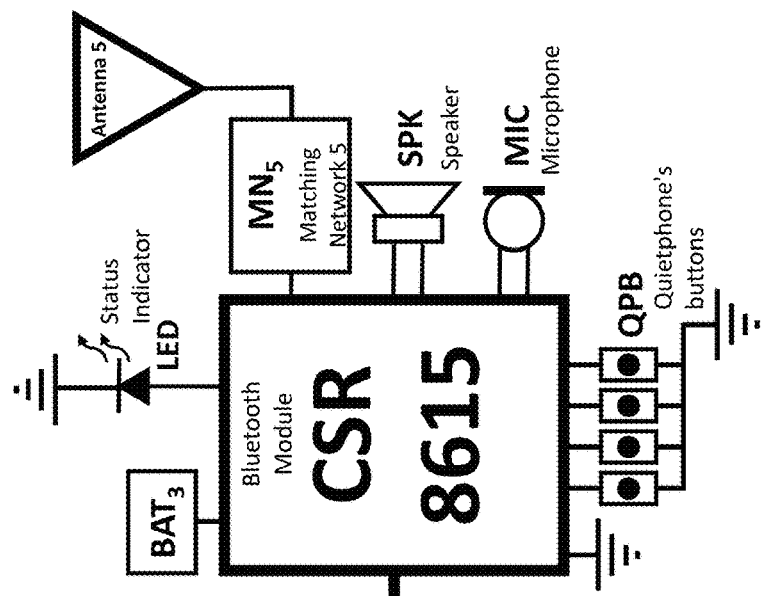
Figure 27D:
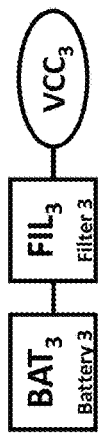

FIG. 27B is a schematic of the WRC. In a preferred embodiment, the WRC features a power supply, an enable/disable button, a microcontroller connected to the power supply and that that features programming, a wireless module connected to the power supply, a matching network and an antenna. FIG. 27C is a schematic of the ORC. As shown, the ORC features a power supply, an antenna plus a matching network for matching the OCR to the WRC, a wireless module coupled to the power supply and that may be for communication to the WRC, a micro controller coupled to the power supply and a keypad and that is programmed, a wireless module coupled to the power supply and that may be for communication to the Quietphone™, and an antenna and matching network for matching the ORC to the Quietphone™. FIG. 27D is a schematic of the Quietphone™ as it pertains to disable/enable functionality. As shown, the Quietphone™ features a power supply, an antenna with a matching network for matching the Quietphone™ to the ORC, a wireless module connected to the power supply and that may be for communications between the Quietphone™ and the ORC, a micro controller and programming, and Bluetooth and other components for coupling the Quietphone™ to a cellular phone or phone network.

Figure 28:
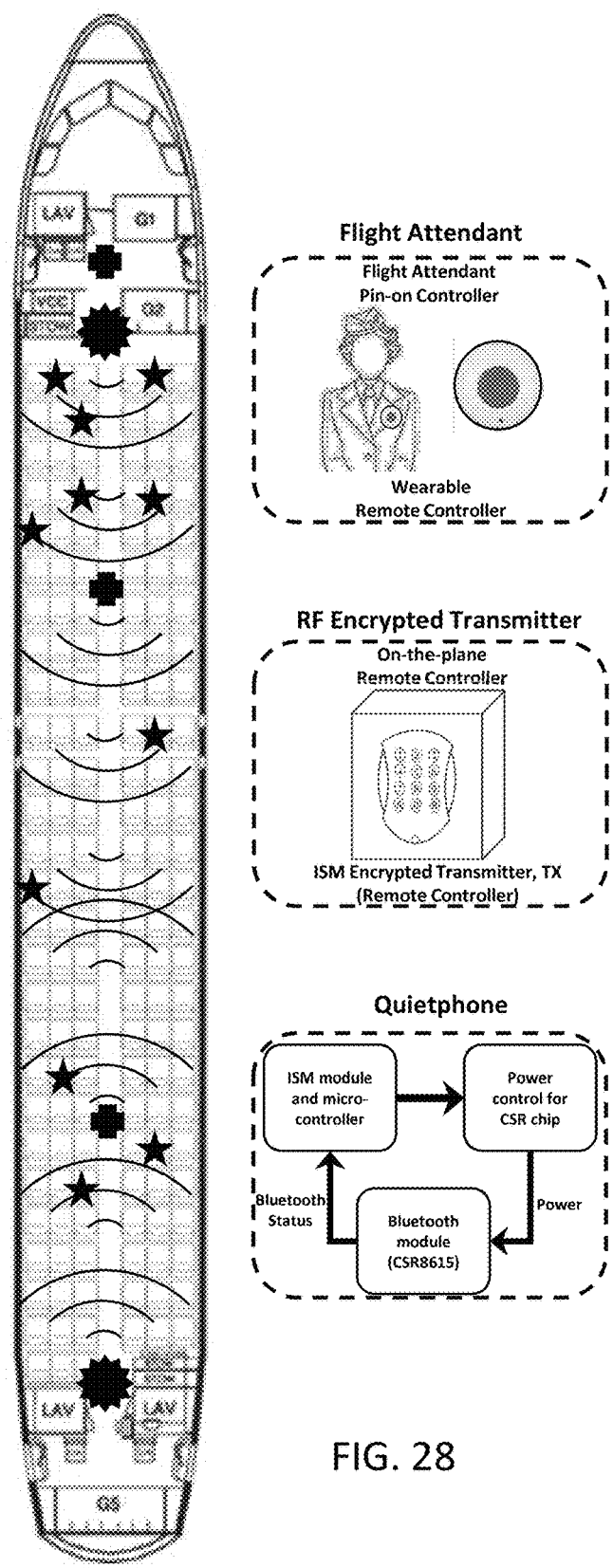

FIG. 28 is a diagram of an airplane passenger fuselage and an illustration of the disclosed enable/disable feature of a communication device. As shown, an airplane passenger fuselage is provided. In one embodiment, an RF encrypted transmitter ORC (shown on the right and represented by a twelve pointed star) may be provided at various points (e.g., front and back) in the fuselage to enable/disable a plurality of Quietphones™ (represent by a five pointed star) having a microcontroller to deactivate the power to a Bluetooth chipset of the Quietphones™ to prevent the communication via the device. Suitably, a flight attendant (represented by a cross) may have a WRC that communicates commands to enable or disable the phone to the ORC. Suitably, the WRC may be a wearable device to enable/disable the Quietphones™. In one embodiment, the WRC device features a single control button that, when pressed for 2 or more seconds, sends a wireless encrypted radio frequency (RF) signal to the on-plane ORCs to disable all the Quietphones™ in the airplane fuselage. In one mode of operation, the WRC may have a vibration mechanism to alert all flight attendants when the ORC has been activated to disable/enable the Quietphones™.

As shown on the right in FIG. 28, the WRC, in one embodiment, may suitably include a keypad that may be operated by a flight attendant. The WRC may also preferably include an ISM RF encrypted transmitter with two operation modes: (1) when the right code is entered into the key pad, the RF encrypted transmitter sends an RF signal to disable Quietphones™ on-board and the same will be disabled while the signal remains active; (2) when a signal is detected from the WRC controller of a flight attendant, the WRC sends a signal to (a) disable Quietphones™ on-board and the same will be disabled while the signal remains active and (b) the WRC controllers to vibrate while the signal remains active. Finally, the ORC suitably includes an RF encrypted wireless reception circuit that will receive the commands from the WRC and then decode and perform the enable/disable action on the Quietphones™. Suitably, the ORC, once the enable/disable signal is received from the WRC, a microcontroller in the Quietphones™ will deactivate the power to a Bluetooth chipset of the Quietphones™ to prevent the communication via the device. In one embodiment, the ISM module, located in the Quietphones™ circuit board is continuously looking for a coded message from the WRC when the Quietphones™ is active.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

PAPER "SEQUENCE LISTING"

Not applicable.

We claim:

1. A method of privately communicating comprising the steps of:
    obtaining a telephone handset or headset comprising—
        a suppressor or anechoic chamber disposed at a first point of the handset or headset, said suppressor chamber featuring a mouth opening for engaging in a mouth of a user,
        an ear chamber disposed at a second point of the handset or headset with an ear opening for engaging the ear of a user;
        an on-phone controller;
    simultaneously engaging the mouth opening and ear opening with a mouth and ear respectively;
    communicating via the mouth so that air is captured via the suppressor chamber;
    employing a wireless remote control to disable the telephone handset or headset via an encrypted radio frequency signal communicated to the on-phone controller.

2. The method of claim 1 further comprising the step of vibrating the wireless control as a notification that the handset is disabled.

* * * * *